(12) United States Patent
Kang et al.

(10) Patent No.: US 12,744,885 B2
(45) Date of Patent: Sep. 22, 2026

(54) PREDICTION BLOCK GENERATION AT VIDEO FRAME BOUNDARY

(71) Applicants: Hyundai Motor Company, Seoul (KR); Kia Corporation, Seoul (KR); EWHA University—Industry Collaboration Foundation, Seoul (KR)

(72) Inventors: Je Won Kang, Seoul (KR); Jin Heo, Yongin-si (KR); Seung Wook Park, Yongin-si (KR)

(73) Assignees: Hyundai Motor Company, Seoul (KR); Kia Corporation, Seoul (KR); EWHA University—Industry Collaboration Foundation, Seoul (KR)

( * ) Notice: Subject to any disclaimer, the term of this patent is extended or adjusted under 35 U.S.C. 154(b) by 0 days.

(21) Appl. No.: 18/810,974

(22) Filed: Aug. 21, 2024

(65) Prior Publication Data

US 2024/0414323 A1 Dec. 12, 2024

Related U.S. Application Data

(63) Continuation of application No. PCT/KR2023/001514, filed on Feb. 2, 2023.

(30) Foreign Application Priority Data

Mar. 7, 2022 (KR) ........................ 10-2022-0028803
Jan. 31, 2023 (KR) ........................ 10-2023-0012682

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/52* (2014.11)

(58) Field of Classification Search
None
See application file for complete search history.

(56) References Cited

U.S. PATENT DOCUMENTS

2020/0280736 A1 9/2020 Wang et al.
2021/0160527 A1 5/2021 Chuang et al.
(Continued)

FOREIGN PATENT DOCUMENTS

KR 20190062300 A 6/2019
KR 20210130154 A 10/2021
WO 2021167755 A1 8/2021

OTHER PUBLICATIONS

Chen, Yi-Wen, et al., "AHG12: Enhanced bi-directional motion compensation", Input Document to JVET, Joint Video Experts Team (JVET) of ITU-T SG 16 WP 3 and ISO/IEC JTC 1/SC 29, 25th Meeting, by teleconference Jan. 12-21, 2022 (Jan. 6, 2022) (Year: 2022).*

(Continued)

*Primary Examiner* — Lindsay J Uhl
(74) *Attorney, Agent, or Firm* — Slater Matsil, LLP

(57) ABSTRACT

A method of video decoding device for inter-predicting a current block can include decoding motion information of the current block from a bitstream, the motion information including reference pictures that are in a bi-direction manner, and motion vectors that are in the bi-direction manner, generating prediction blocks that are in the bi-direction manner by using the motion information, the prediction blocks include a first prediction block that is located inside a corresponding first reference picture, and a second prediction block that is a remnant of the first prediction block, the second prediction block includes an inner region located inside a second reference picture that is relevant, and an outer region located outside the second reference picture, setting weights for the prediction blocks that are in the (Continued)

bi-direction manner; and generating a final prediction block of the current block by weighted-summing the prediction blocks by using the weights.

19 Claims, 20 Drawing Sheets

(51) Int. Cl.
*H04N 19/176* (2014.01)
*H04N 19/52* (2014.01)

(56) References Cited

U.S. PATENT DOCUMENTS

2022/0078485 A1 3/2022 Ko et al.
2024/0388731 A1* 11/2024 Deng .................. H04N 19/132

OTHER PUBLICATIONS

Chen, Yi-Wen, et al., "AHG12: Enhanced bi-directional motion compensation," Joint Video Experts Team (JVET) of ITU-T SG 16 WP 3 and ISO/IEC JTC 1/SC 29, Document: JVET-Y0125, 25th Meeting, Jan. 12-21, 2022, 5 pages.

* cited by examiner

Map of Weights For Luma

Map of Weights For Chroma

| Merge Index | L0 | L1 |
|---|---|---|
| 0 | A0 | A1 |
| 1 | B0 | B1 |
| 2 | C0 | C1 |
| 3 | D0 | D1 |
| 4 | E0 | E1 |
| 5 | F0 | F1 |

Merging Candidate List

| GPM Merge Index | L0 or L1 |
|---|---|
| 0 | A0 |
| 1 | B1 |
| 2 | C0 |
| 3 | D1 |
| 4 | E0 |
| 5 | F1 |

GPM Candidate List

PREDICTION BLOCK GENERATION AT VIDEO FRAME BOUNDARY

CROSS-REFERENCE TO RELATED APPLICATIONS

This application is a continuation of International Application No. PCT/KR2023/001514 filed on Feb. 2, 2023, which claims priority to and the benefit of Korean Patent Application No. 10-2022-0028803 filed on Mar. 7, 2022, and Korean Patent Application No. 10-2023-0012682, filed on Jan. 31, 2023, the entire contents of each of which are incorporated herein by reference.

TECHNICAL FIELD

The present disclosure relates to a method of generating a prediction block at video frame boundaries.

BACKGROUND

The statements in this section merely provide background information related to the present disclosure and do not necessarily constitute prior art.

Because video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, because the image size, resolution, and frame rate gradually increase, the amount of data to be encoded also increases. Accordingly, a new compression technique providing higher coding efficiency and an improved image enhancement effect than existing compression techniques is required.

When current block is inter-predicted, padding of reference samples around the boundaries of the reference frame (or 'reference picture') allows regions outside the frame boundaries to be referenced with motion vectors and thereby generates a reference block. These reference blocks may or may not be used as they are. However, the reference block portion external to the reference frame is typically mere sample repetitions derived from boundary samples within the reference picture, which may have very low prediction efficiency. Therefore, to enhance video quality and increase coding efficiency, methods need to be provided for efficiently utilizing the reference block portion that is external to the reference frame.

SUMMARY

An embodiment of the present disclosure can provide a video coding method and an apparatus that is responsive to when a prediction block, having been referenced by a motion vector during inter prediction of a current block, has all or part thereof located outside the reference frame. To enhance video quality and increase video coding efficiency, instead of using this prediction block as is or not, the video coding method and the apparatus adaptively generate a prediction block.

An embodiment of the present disclosure can provide a method performed by a video decoding device for inter-predicting a current block. The method can include decoding motion information of the current block from a bitstream. The motion information can include reference pictures that are in a bi-direction manner, and motion vectors that are in the bi-direction manner. The method also can include generating prediction blocks that are in the bi-direction manner by using the motion information. The prediction blocks can include a first prediction block that is located inside a corresponding first reference picture, and a second prediction block that is a remnant of the first prediction block and can include an inner region located inside a second reference picture that is relevant and an outer region located outside the second reference picture. The method also can include setting weights for the prediction blocks that are in the bi-direction manner. The method also can include generating a final prediction block of the current block by weighted-summing the prediction blocks by using the weights.

An embodiment of the present disclosure can provide a method performed by a video encoding device for inter-predicting a current block. The method can include determining motion information of the current block. The motion information can include reference pictures that are in a bi-direction manner, and motion vectors that are in the bi-direction manner. The method also can include generating prediction blocks that are in the bi-direction manner by using the motion information. The prediction blocks can include a first prediction block that is located inside a corresponding first reference picture, and a second prediction block that is a remnant of the first prediction block and can include an inner region located inside a second reference picture that is relevant and an outer region located outside the second reference picture. The method also can include setting weights for the prediction blocks that are in the bi-direction manner. The method also can include generating a final prediction block of the current block by weighted-summing the prediction blocks by using the weights.

An embodiment of the present disclosure can provide a computer-readable recording medium storing a bitstream generated by a video encoding method. The video encoding method can include determining motion information of a current block. The motion information can include reference pictures that are in a bi-direction manner, and motion vectors that are in the bi-direction manner. The video encoding method also can include generating prediction blocks that are in the bi-direction manner by using the motion information. The prediction blocks can include a first prediction block that is located inside a corresponding first reference picture, and a second prediction block that is a remnant of the first prediction block and includes an inner region located inside a second reference picture that is relevant and an outer region located outside the second reference picture. The video encoding method also can include setting weights for the prediction blocks that are in the bi-direction manner. The video encoding method also can include generating a final prediction block of the current block by weighted-summing the prediction blocks by using the weights.

As described above, an embodiment of the present disclosure can provide a video coding method and an apparatus responsive to when a prediction block, having been referenced by a motion vector during inter prediction of the current block, has all or part thereof located outside the reference frame. Instead of using this prediction block as is or not, the video coding method and the apparatus adaptively generate a prediction block. Thus, the video coding method and the apparatus improve video quality and increase video coding efficiency.

A method is disclosed for generating a prediction block at video frame boundaries. A video coding method and an apparatus can be responsive to when a prediction block, having been referenced by a motion vector during inter prediction of a current block, has all or part thereof located outside the reference frame. Instead of using this prediction block as is or not, the video coding method and the apparatus can adaptively generate a prediction block.

DETAILED DESCRIPTION OF ILLUSTRATIVE EMBODIMENTS

Figure 1:
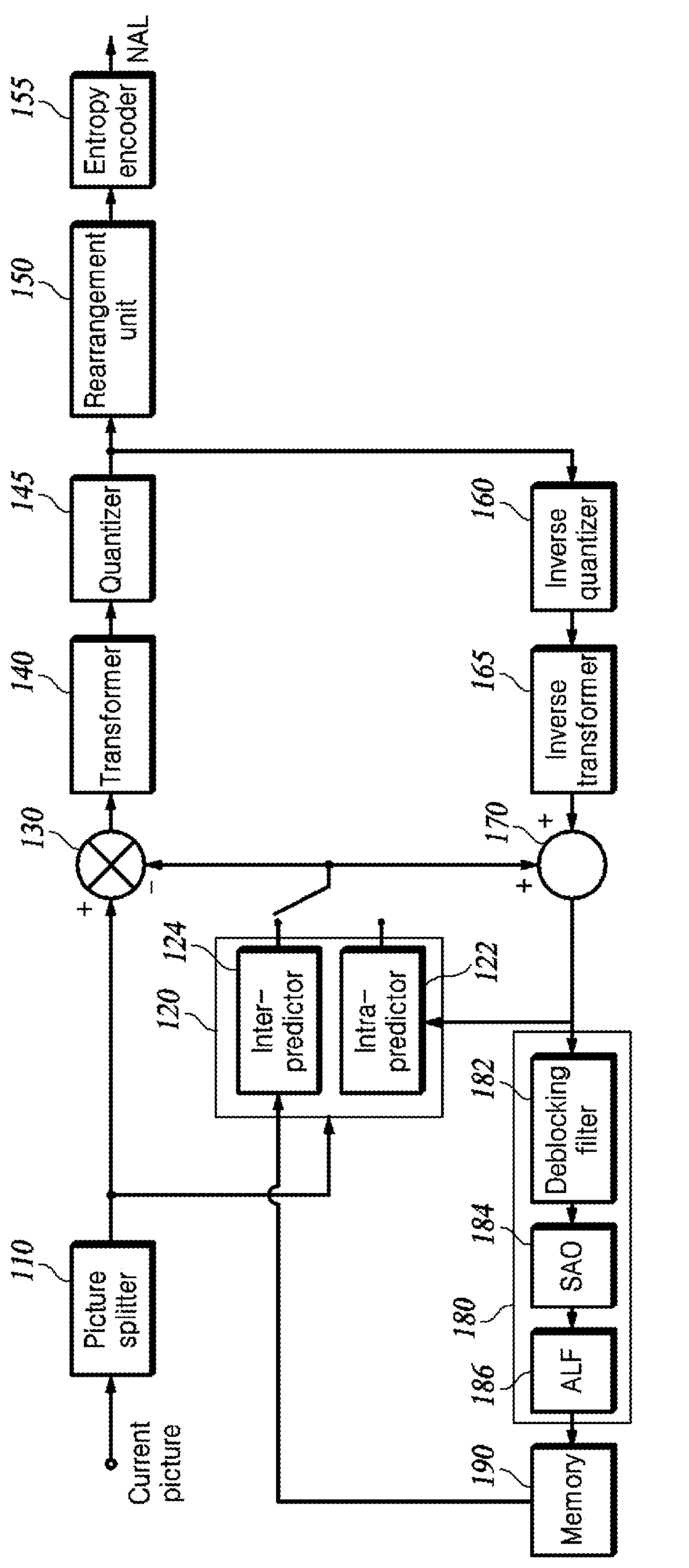
FIG. 1 is a block diagram of a video encoding apparatus that may implement the techniques of an embodiment of the present disclosure.

Hereinafter, some example embodiments of the present disclosure are described in detail with reference to the accompanying illustrative drawings. In the following description, like reference numerals can designate like elements, although the elements are shown in different drawings. Further, in the following description of some example embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. One or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUS included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. A binarytree ternarytree (BTTT) can be added to the tree structures to be referred to as a multiple-type tree (MTT).

Figure 2:
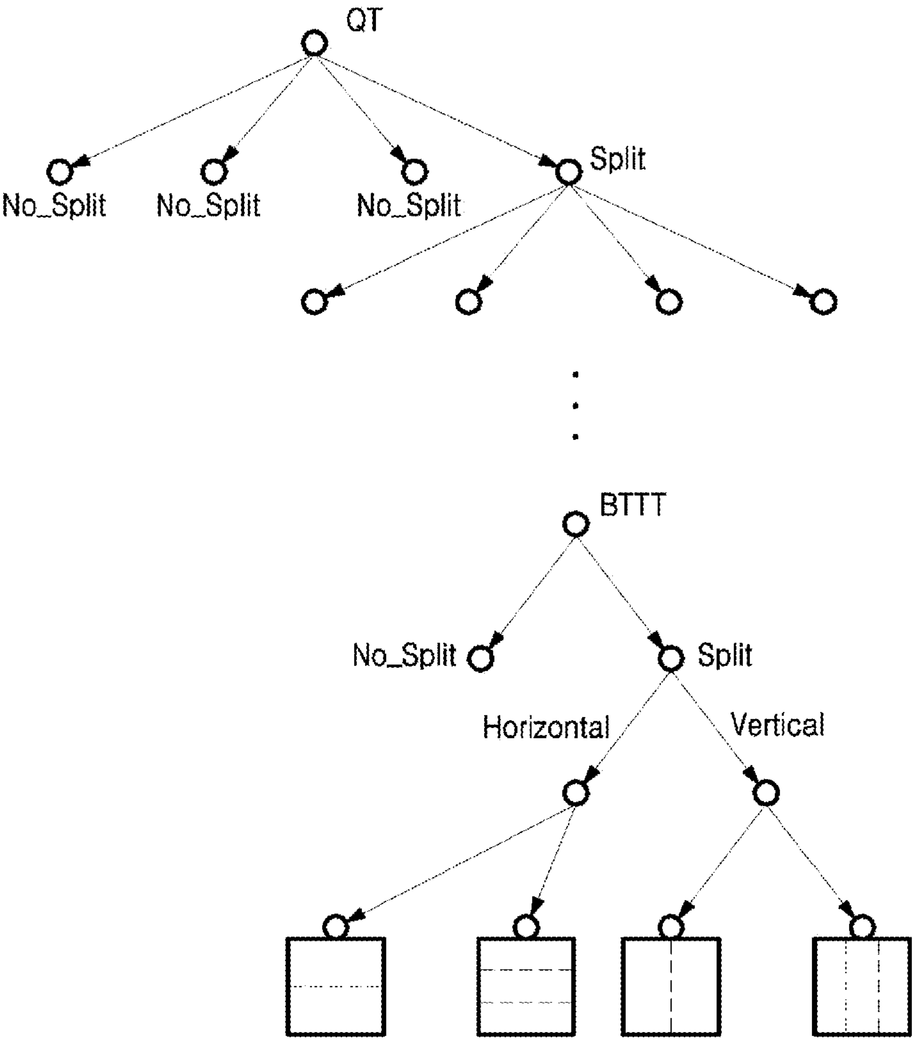
FIG. 2 illustrates a method embodiment for partitioning a block using a quadtree plus binarytree ternarytree (QTBTTT) structure.

FIG. 2 is a diagram for describing a method for splitting a block by using a QTBTIT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer can be encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. A type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
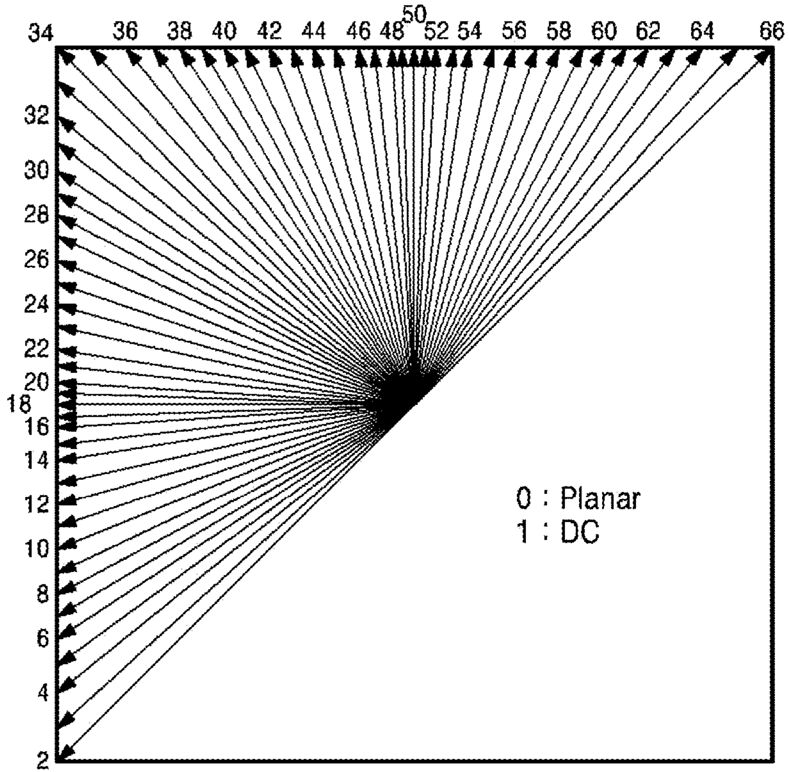
FIGS. 3A and 3B illustrate a plurality of intra prediction modes including wide-angle intra prediction modes, according to an embodiment of the present disclosure.

The intra predictor 122 predicts pixels in the current block by using pixels (reference pixels) positioned on a neighbor of the current block in the current picture including the current block. There can be a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
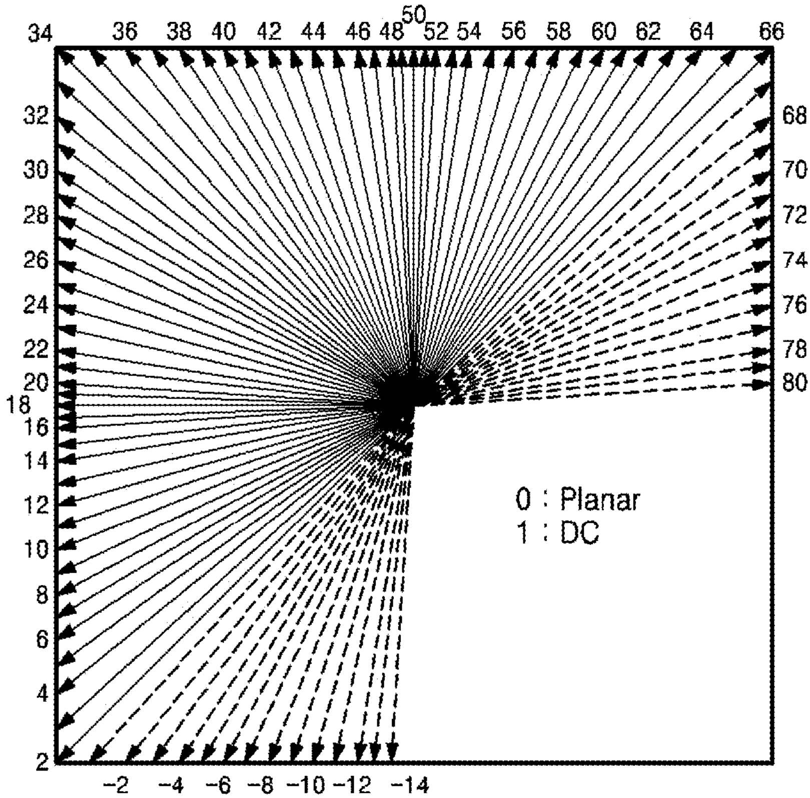

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction can be opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

The inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block can be generated by averaging or weighted-averaging the first reference block and the second reference block. In addition, motion information including information on two reference pictures used for predicting the current block and including information on two motion vectors is delivered to the entropy encoder 155. Reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
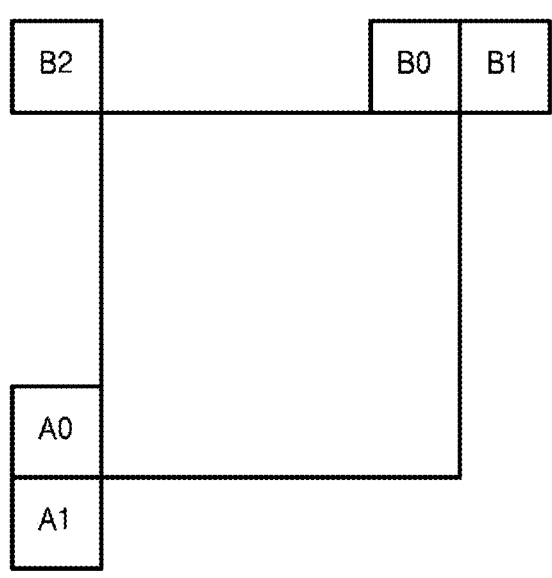
FIG. 4 illustrates neighboring blocks of a current block, according to an embodiment of the present disclosure.

As a neighboring block for deriving the merge candidate, all or some of a left block A, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block can be selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information can be an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, because the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

The motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. The transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

The transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS can be encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
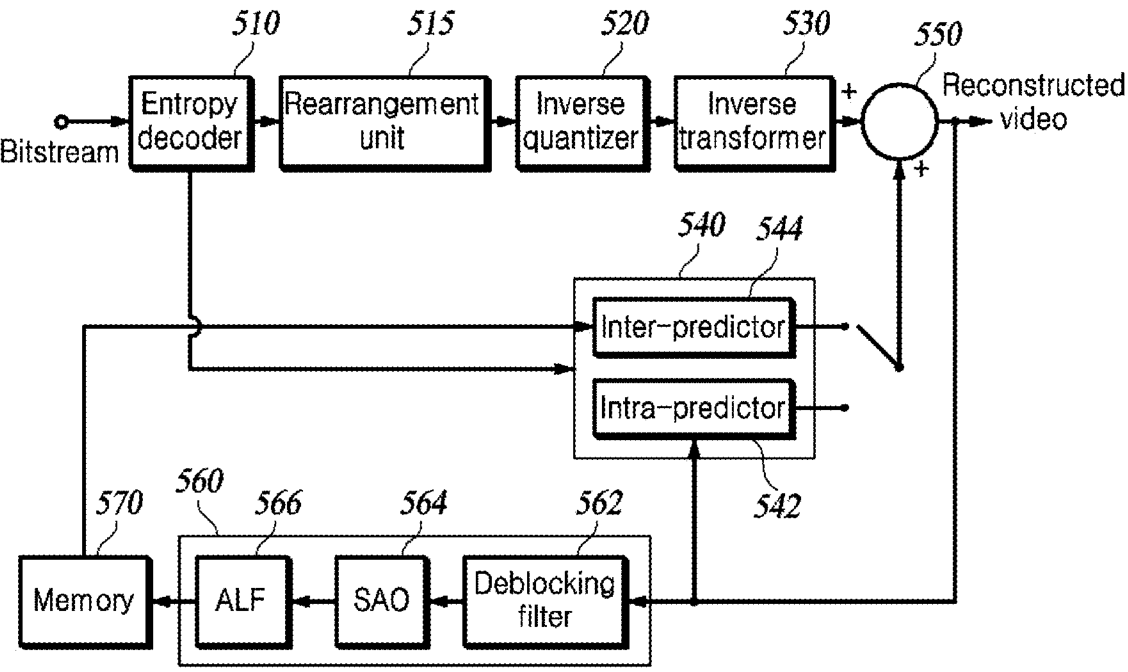
FIG. 5 is a block diagram of a video decoding apparatus that may implement the techniques of an embodiment of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

When the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "o" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 can be activated when the prediction type of the current block is the intra prediction, and the inter predictor 544 can be activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus responsive to when a prediction block, having been referenced by a motion vector during inter prediction of the current block, has all or part thereof located outside the reference frame. Instead of using this prediction block as is or not, the video coding method and the apparatus adaptively generate a prediction block.

The following embodiments may be performed by the inter predictor 124 in the video encoding device. The following embodiments may also be performed by the inter predictor 544 in the video decoding device.

The video encoding device in encoding the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Intra Block Copy (IBC)

The IBC performs an intra prediction of the current block by copying a reference block in the same frame by using the block vector to generate a prediction block of the current block.

The video encoding device performs block matching to derive an optimal block vector. The block vector herein represents a displacement from the current block to the reference block. To increase coding efficiency, instead of transmitting the whole block vector, the video encoding device may split the block vector into a block vector predictor (BVP) and a block vector difference (BVD), and encode and transmit the BVP and BVD to the video decoding device.

Hereinafter, the spatial resolution of the BVD and the spatial resolution of the block vector are considered to be the same.

In terms of utilizing block vectors, the IBC is characterized by inter prediction. Therefore, IBC may be categorized into IBC merge/skip mode and IBC AMVP mode.

In the case of IBC merge/skip mode, the video encoding device first composes an IBC merge list. In terms of optimizing coding efficiency, the video encoding device may select a block vector from among the candidates included in the IBC merge list and may use the selected block vector as a block vector predictor (BVP). The video encoding device determines a merge index that indicates the selected block vector. However, the video encoding device does not generate a BVD. The video encoding device encodes and sends the merge index to the video decoding device. The IBC merge list may be composed in the same way by the video encoding device and the video decoding device. After the video decoding device decodes the merge index, the video decoding device may use the merge index to generate a block vector from the IBC merge list.

The video encoding device, in case of the IBC skip mode, utilizes the same block vector transmission method as in the IBC merge mode, but does not transmit a residual block that equals to the difference between the current block and the prediction block.

In the IBC AMVP mode, the video encoding device determines a motion vector and composes an IBC AMVP list in terms of optimizing the coding efficiency. The video decoding device determines a candidate index that indicates one of the candidate block vectors included in the IBC AMVP list to be the BVP. The video encoding device calculates the BVD which is the difference between the BVP and the motion vector. The video encoding device then encodes the candidate index and the BVD and transmits the encoded candidate index and the encoded BVD to the video decoding device.

The video decoding device decodes the candidate index and the BVD. Upon obtaining, from the IBC AMVP list, the BVP indicated by the candidate index, the video decoding device may sum the BVP and the BVD to reconstruct the motion vector.

The following inter-prediction techniques are used to improve the coding efficiency and improve the accuracy of inter prediction. These techniques are performed by the inter predictor 124 in the video encoding device, but may also be performed by the inter predictor 544 in the video decoding device as described above.

II-1. Merge/Skip Mode, MMVD, AMVP Mode, and AMVR

The merge/skip modes include regular merge mode, Merge mode with Motion Vector Difference mode (MMVD mode), Combined Inter and Intra Prediction mode (CIIP mode), geometric partitioning mode (GPM), and subblock merge mode. The subblock merge mode is divided into Subblock-based Temporal Motion Vector Prediction (SbTMVP) and affine merge mode.

The Advanced Motion Vector Prediction (AMVP) mode includes a regular AMVP mode, a Symmetric MVD mode (SMVD mode), and an affine AMVP mode.

The following describes a method of composing a merging candidate list of motion information in a merge/skip mode of inter prediction. To support the merge/skip mode, the inter predictor 124 in the video encoding device may select a preset number of (e.g., six) merge candidates to form a merging candidate list.

The inter predictor 124 searches for the spatial merge candidates. The inter predictor 124 detects spatial merge candidates from neighboring blocks, as illustrated in FIG. 4. At most four spatial merge candidates may be selected. The spatial merge candidates are also referred to as Spatial MVPs (SMVPs).

The inter predictor 124 searches for a temporal merge candidate. The inter predictor 124 may add, as a temporal merge candidate, a block that is co-located with the current block within a reference picture other than the current picture holding the target block. The reference picture may or may not be the same as the reference picture used to predict the current block. One temporal merge candidate may be selected. The temporal merge candidates are also referred to as Temporal MVPs (TMVPs).

The inter predictor 124 searches for a History-based Motion Vector Predictor (HMVP) candidate. The inter predictor 124 may store the previous motion vectors of the h CUs (where h is a natural number) in a table and may utilize the stored motion vectors as merge candidates. The size of the table is 6, and the table stores the previous motion vectors of the CUS in a FIFO (first-in-first-out) manner. This indicates that at most six HMVP candidates are stored in the table. The inter predictor 124 may set as the merge candidates the most recent motion vectors among the HMVP candidates stored in the table.

The inter predictor 124 searches for PAMVP (Pairwise Average MVP) candidates. The inter predictor 124 may set as the merge candidate the average of the motion vectors of the first candidate and the second candidate in the merging candidate list.

If the merging candidate list cannot be fulfilled (i.e., the preset number of candidates is not filled) after performing all of the above described search processes, the inter predictor 124 adds the zero motion vector as a merge candidate.

In terms of optimizing coding efficiency, the inter predictor 124 may determine a merge index that indicates one candidate in the merging candidate list. The inter predictor 124 may use the merge index to derive a motion vector predictor (MVP) from the merging candidate list, and then may determine the MVP as the motion vector of the current block. Further, the video encoding device may signal the merge index to the video decoding device.

The video encoding device, in the skip mode, utilizes the same motion vector transmission method as in the merge mode but does not transmit a residual block corresponding to the difference between the current block and the prediction block.

The above described method of composing the merging candidate list may be performed equally by the inter predictor 544 in the video decoding device. The video decoding device may decode the merge index. The inter predictor 544 may use the merge index to derive the MVP from the merging candidate list, and then may determine the MVP as the motion vector of the current block.

On the other hand, when the MMVD technique is sutilized, the inter predictor 124 may use the merge index to derive the MVP from the merging candidate list. For example, the first or second candidate of the merging candidate list may be used as the MVP. Further, in terms of optimizing the coding efficiency, the inter predictor 124 determines a distance index and a direction index. The inter predictor 124 may use the distance index and the direction index to derive a motion vector difference (MVD), and then may sum the MVD and the MVP to reconstruct the motion vector of the current block. Further, the video encoding device may signal the merge index, the distance index, and the direction index to the video decoding device.

The MMVD technique described above may be equally performed by the inter predictor 544 in the video decoding device. The video decoding device may decode the merge index, the distance index, and the direction index. After composing the merging candidate list, the inter predictor 544 may use the merge index to derive the MVP from the merging candidate list. The inter predictor 544 may use the distance index and the direction index to derive the MVD, and then may sum the MVD and the MVP to reconstruct the motion vector of the current block.

Hereinafter, a method is described for composing a candidate list of motion information in an AMVP mode of inter prediction. To support the AMVP mode, the inter predictor 124 in the video encoding device may select a preset number of (e.g., two) candidates to form a candidate list.

The inter predictor 124 searches for the spatial candidates. The inter predictor 124 searches for spatial candidates from neighboring blocks, as illustrated in FIG. 4. Up to two spatial candidates may be selected.

The inter predictor 124 searches for a temporal candidate. The video encoding device may add, as a temporal candidate, a block that is co-located with the current block within a reference picture other than the current picture holding the target block. The reference picture may or may not be the same as the reference picture used to predict the current block. One temporal merge candidate may be selected.

If the candidate list cannot be fulfilled (i.e., the preset number of candidates is not fulfilled) after performing all of the above-described search processes, the inter predictor 124 adds a zero motion vector as a candidate.

In terms of optimizing coding efficiency, the inter predictor 124 may determine a candidate index that indicates one candidate in the candidate list. The inter predictor 124 may use the candidate index to derive an MVP from the candidate list. Further, in terms of optimizing the coding efficiency, the inter predictor 124 determines the motion vector and subtracts the MVP from the motion vector to calculate the MVD. Further, the video encoding device may signal the candidate index and the MVD to the video decoding device.

The above described method of composing the AMVP candidate list may be equally performed by the inter predictor 544 in the video decoding device. The video decoding device may decode the candidate index and the MVD. The inter predictor 544 may use the candidate index to derive an MVP from the candidate list. The inter predictor 544 may sum the MVD and MVP to reconstruct the motion vector of the current block.

The video encoding device transmits information for determining the spatial resolution of the MVD along with the MVD. When AMVR technology is used, the video encoding device may determine an adaptive spatial resolution of the MVD in terms of optimizing rate distortion. In this case, the spatial resolution of the MVD may be the same as that of the motion vector.

When AMVR technology is used, the video encoding device signals amvr_flag and amvr_precision_idx to the video decoding device to indicate the spatial resolution of the MVD. For example, if amvr_flag is signaled as 0, the video decoding device sets the MVD to ¼-pel spatial resolution. On the other hand, if amvr_flag is not zero, the video decoding device may determine the spatial resolution of the MVD according to amvr_precision_idx. In this case, the spatial resolution of the selectable MVD may vary depending on the prediction method applied with AMVR. The prediction methods to which AMVR can be applied include a regular AMVP mode, an affine AMVP mode, an intra block copy (IBC) AMVP mode, and the like.

II-2. Affine Merge Mode and Affine AMVP Mode

Inter prediction is a motion prediction that reflects a translational motion model. Namely, inter prediction is a technique that predicts motion in the horizontal direction (x-axis direction) and vertical direction (y-axis direction). However, in reality, there may be various forms of motion other than translational motion, such as rotation, zoom-in, or zoom-out. An affine motion prediction may reflect these different forms of motion.

Figure 6A:
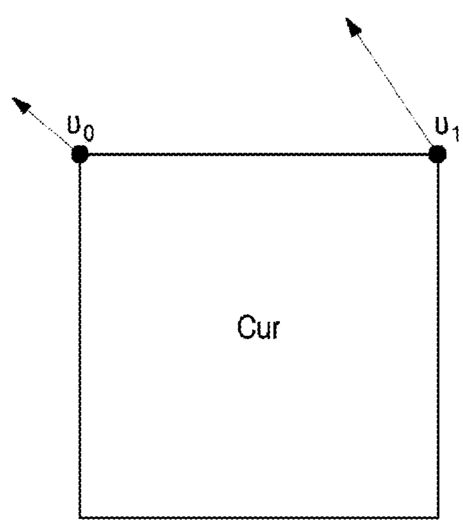
FIGS. 6A and 6B are diagrams illustrating affine motion prediction, according to an embodiment of the present disclosure.
Figure 6B:
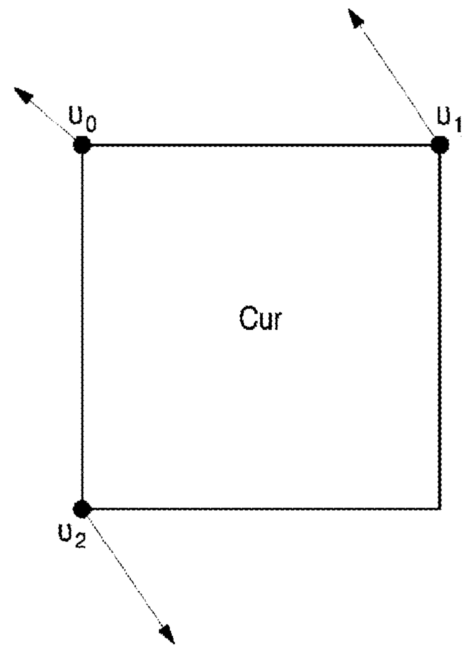

FIGS. 6A and 6B are diagrams illustrating affine motion prediction according to at least one embodiment of the present disclosure.

Two types of models for affine motion prediction may exist. One is a model as shown in the example of FIG. 6A that utilizes two Control Point Motion Vectors (CPMVs) of the top-left corner and the top-right corner of the target block currently to be encoded, i.e., four parameters. The other is a model as shown in the example in FIG. 6B that uses three Control Point Motion Vectors of the top-left corner, top-right corner, and bottom-left corner of the target block, i.e., six parameters.

The four-parameter affine model is represented as shown in Equation 1. The motion of at a sample position (x,y) in the target block may be computed as shown in Equation 1. The position of the top-left sample of the target block is assumed to be (0,0).

$$\begin{cases} mv_x = \frac{mv_{1x} - mv_{ox}}{W}x - \frac{mv_{1y} - mv_{oy}}{W}y + mv_{0x} \\ mv_y = \frac{mv_{1y} - mv_{oy}}{W}x + \frac{mv_{1x} - mv_{ox}}{W}y + mv_{0y} \end{cases} \quad \text{[Equation 1]}$$

Further, the 6-parameter affine model is represented as shown in Equation 2. The motion at a sample location (x,y) in the target block may be computed as shown in Equation 2.

$$\begin{cases} mv_x = \frac{mv_{1x} - mv_{ox}}{W}x + \frac{mv_{2x} - mv_{ox}}{H}y + mv_{0x} \\ mv_y = \frac{mv_{1y} - mv_{oy}}{W}x + \frac{mv_{2y} - mv_{oy}}{H}y + mv_{0y} \end{cases} \quad \text{[Equation 2]}$$

Here, (mv0x,mv0y) is the top-left control point motion vector, (mv1x,mv1y) is the top-right control point motion vector, and (mv2x,mv2y) is the bottom-left control point motion vector. W is the horizontal length of the target block and H is the vertical length of the target block.

The affine motion prediction may be performed by using a motion vector computed according to Equation 1 or Equation 2 for each sample in the target block. Alternatively, the computation may be performed, for example, on a subblock-by-subblock basis after partitioning the target block into subblocks of size 4×4, to reduce computational complexity.

The motion vector (mvx,mvy) may be set to have a 1/16 sample precision. In this case, the motion vector (mvx,mvy) calculated according to Equation 1 or 2 may be rounded in the 1/16 sample unit.

The video encoding device performs intra prediction, inter prediction (translational motion prediction), affine motion prediction, and the like, and selects an optimal prediction method by calculating a rate-distortion (RD) cost. To perform affine motion prediction, the inter predictor 124 of the video encoding device determines which of the two types of models to use, and determines two or three control points depending on the determined type. Using the control point motion vectors, the inter predictor 124 computes a motion vector (mvx,mvy) for each of the subblocks in the target block. Then, the inter predictor 124 uses the motion vector (mvx,mvy) of each subblock to perform motion compensation in the reference picture on a subblock-by-subblock basis and thereby generates a prediction block for each subblock within the target block.

The video encoding device encodes and passes to the video decoding device affine-related syntax elements including a flag indicating whether affine motion prediction is applied to the target block, type information indicating the type of the affine model, and motion information indicating the motion vector of each control point. The type information and the motion information of the control points may be signaled when an affine motion prediction is performed, and the motion vectors of the control points may be signaled in a number determined according to the type information.

The video decoding device determines the type of the affine model and the control point motion vectors by using the signaled syntaxes, and calculates the motion vector (mvx,mvy) for each 4×4 subblock in the target block by using Equation 1 or 2. If the motion vector resolution information is signaled for the affine motion vector of the target block, the motion vector (mvx,mvy) is modified to a precision identified by the motion vector resolution information by using an operation such as rounding.

The video decoding device generates a prediction block for each subblock by performing motion compensation within the reference picture by using the motion vector (mvx,mvy) for each subblock.

To reduce the amount of bits required to encode the control point motion vectors, a regular inter prediction (translational motion prediction) scheme as described above may be applied.

In one example of an affine merge mode, the inter predictor 124 of the video encoding device composes an affine merging candidate list of a predetermined number of (e.g., 5) affine merge candidates. First, the inter predictor 124 of the video encoding device derives the inherited affine merge candidates from the neighboring blocks of the target block. For example, by deriving a predetermined number of inherited affine merge candidates from the neighboring samples A0, A1, B0, B1, and B2 of the target block shown in FIG. 4, a merging candidate list is generated. Each of the inherited affine merge candidates in the candidate list corresponds to a combination of two or three CPMVs.

The inter predictor 124 derives inherited affine merge candidates from control point motion vectors of the target block's neighboring blocks that are predicted in affine mode. In some embodiments, the number of merge candidates derived from the neighboring blocks predicted in affine mode may be limited. For example, the inter predictor 124 may derive, from the neighboring blocks predicted in affine mode, two inherited affine merge candidates, i.e., one of A0 and A1, and one of B0, B1, and B2. The prioritization may be in the order of A0, A1, and of B0, B1, B2.

On the other hand, if the total number of merge candidates is three or more, the inter predictor 124 may derive an insufficient number of constructed affine merge candidates from the translational motion vectors of the neighboring blocks.

Figure 7:
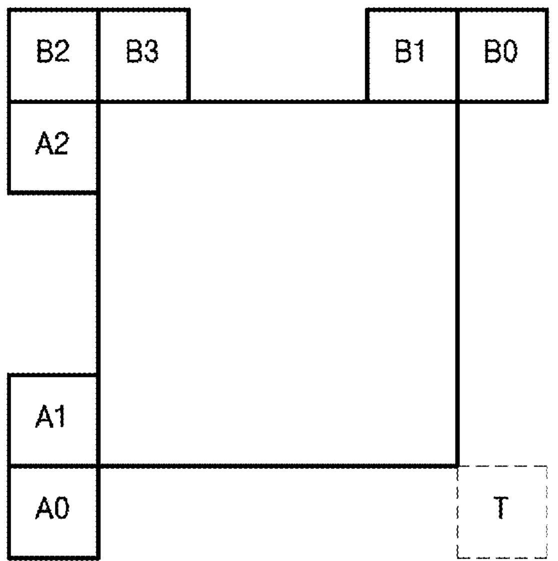
FIG. 7 is a diagram illustrating a method of deriving constructed affine merge candidates for affine motion prediction, according to an embodiment of the present disclosure.

FIG. 7 is a diagram illustrating a method of deriving constructed affine merge candidates for affine motion prediction.

The inter predictor 124 derives control point motion vectors CPMV1, CPMV2, and CPMV3 each from each of the neighboring block groups {B2, B3, A2}, neighboring block group {B1, B0}, and neighboring block group {A1, A0}. As one example, the order of priority within each neighboring block group may be the order of B2, B3, A2, the order of B1, B0, and the order of A1, A0. Furthermore, another control point motion vector CPMV4 is derived from the co-located block T in the reference picture. The inter predictor 124 combines two or three of the four control point motion vectors to generate an insufficient number of constructed affine merge candidates. The combinations are prioritized as follows. The elements within each group are listed in the order of top-left, top-right, and bottom-left control point motion vectors.

{CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}

If the merging candidate list cannot be fulfilled by using the inherited affine merge candidates and constructed affine merge candidates, the inter predictor 124 may add a zero motion vector as a candidate.

The inter predictor 124 selects a merge candidate from the merging candidate list in terms of optimizing coding efficiency and determines a merge index that indicates the merge candidate. The inter predictor 124 uses the selected merge candidate to perform an affine motion prediction for the target block. If the merge candidate is composed of two control point motion vectors, an affine motion prediction is performed by using the four-parameter affine model. On the other hand, if the merge candidate is composed of three control point motion vectors, an affine motion prediction is performed by using the six-parameter affine model. The video encoding device encodes and signals the merge index to the video decoding device.

The video decoding device decodes the merge index. The inter predictor 544 of the video decoding device composes a merging candidate list in the same manner as the video encoding device did and performs affine motion prediction by using control point motion vectors corresponding to the merge candidates indicated by the merge index.

As another example, in the case of the affine AMVP mode, in terms of optimizing the coding efficiency, the inter predictor 124 of the video encoding device determines for the target block the type of affine model and the actual control point motion vectors corresponding thereto. For each control point, the inter predictor 124 of the video encoding device calculates the MVD, which is the difference between the actual control point motion vector and the MVP of each control point, and then encodes the MVD of each control point. To derive the MVP of each control point, the inter predictor 124 composes an affine AMVP candidate list including a predetermined number (e.g., two) of affine AMVP candidates. If the target block is of the 4-parameter type, the candidates included in the list are each pair of two control point motion vectors. On the other hand, if the target block is a six-parameter type, the candidates included in the list are each triad of three control point motion vectors.

Using the example of FIG. 8, a method of composing a candidate list in affine AMVP mode is described below. The affine AMVP candidate list may be derived similarly to the method of composing the affine merging candidate list described above.

Figure 8:
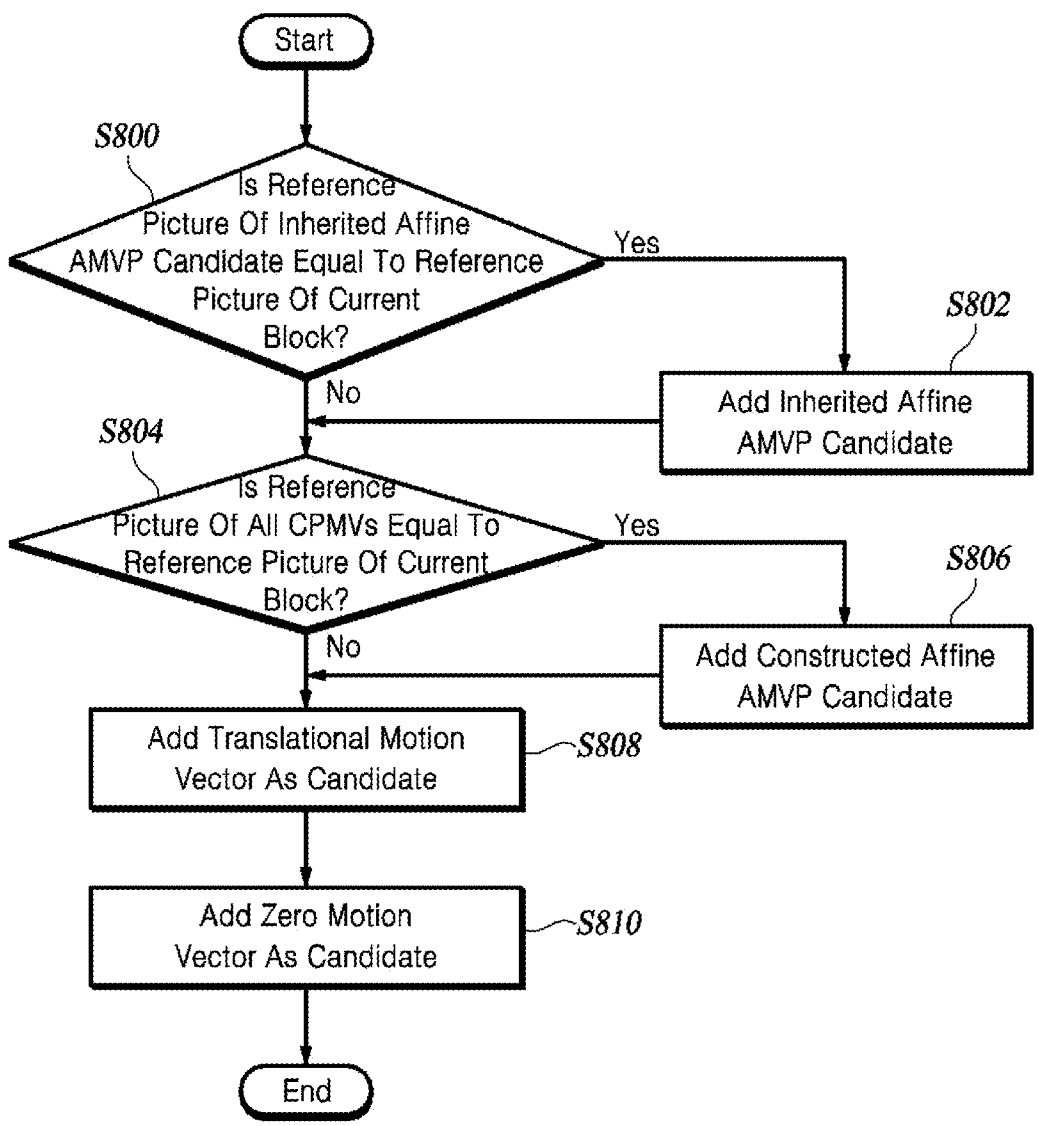
FIG. 8 is a flowchart of a process for searching for affine advanced motion vector predictor (AMVP) candidates in affine AMVP mode, according to an embodiment of the present disclosure.

FIG. 8 is a flowchart of a process for searching for affine AMVP candidates in affine AMVP mode, according to at least one embodiment of the present disclosure.

The inter predictor 124 checks whether the reference picture of the inherited affine AMVP candidate and the reference picture of the current block are the same (S800). The inherited affine AMVP candidate may be a block predicted in affine mode among the neighboring blocks A0, A1, B0, B1, and B2 of the target block shown in FIG. 4, as in the affine merge mode described above.

If the reference picture of the inherited affine AMVP candidate is the same as the reference picture of the current block (Yes in S800), the inter predictor 124 adds the corresponding inherited affine AMVP candidate (S802).

If the reference picture of the inherited affine AMVP candidate is not the same as the reference picture of the current block (No in S800), the inter predictor 124 checks whether the reference pictures of all CPMVs of the constructed affine AMVP candidate are the same as the reference picture of the current block (S804). All CPMVs of the constructed affine AMVP candidate may be derived from the motion vectors of the neighboring samples shown in FIG. 7, as in the affine merge mode described above.

If all CPMVs of the constructed affine AMVP candidate have the same reference picture as the reference picture of the current block (Yes in S804), the inter predictor 124 adds the corresponding constructed affine AMVP candidate (S806).

At this point, the affine model type of the target block needs to be considered. If the affine model type of the target block is a four-parameter type, the video encoding device uses the affine model of the neighboring blocks to derive two control point motion vectors (top-left and top-right control point motion vectors of the target block). If the affine model type of the target block is a 6-parameter type, the affine model of the neighboring block is used to derive the three control point motion vectors (the top-left, top-right, and bottom-left control point motion vectors of the target block).

If the reference picture of all CPMVs and the reference picture of the current block is not the same (No in S804), the inter predictor 124 adds a translational motion vector as an affine AMVP candidate (S808). The translational motion vectors, in the order of mv0, mv1, and mv2, may be utilized to predict the CPMV of the current block.

If the candidate list cannot be fulfilled (i.e., the preset number is not fulfilled) after performing all of the above steps (S800 through S808), the inter predictor 124 adds the zero motion vector as an affine AMVP candidate (S810).

The inter predictor 124 selects one candidate from the affine AMVP list and determines a candidate index that indicates the selected candidate. At this time, each control point motion vector of the selected candidate corresponds to the MVP of each control point. In terms of optimizing the coding efficiency, the inter predictor 124 determines the actual control point motion vector for each control point of the target block and then calculates the MVD between the actual control point motion vector and the MVP of the control point. The video encoding device encodes and signals the affine model type of the target block, the candidate index, and the MVD of each control point to the video decoding device.

The video decoding device decodes the affine model type, the candidate index, and the MVD of each control point. The inter predictor 544 of the video decoding device generates an affine AMVP list in the same manner as the video encoding device and selects a candidate indicated by the candidate index in the affine AMVP list. The inter predictor 544 of the video decoding device by adding the MVP of each control point of the selected candidate and the corresponding MVD to reconstruct the motion vector of each control point. The inter predictor 544 uses the reconstructed control point motion vectors to perform affine motion prediction.

II-3. Geometric Partitioning Mode (GPM)

Figure 9:
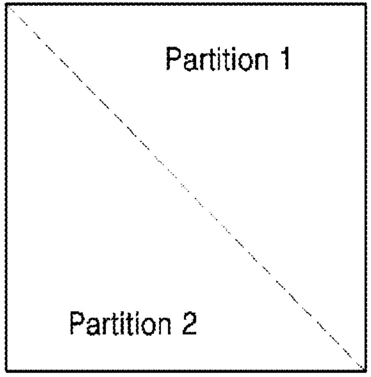
FIG. 9 is a diagram illustrating the types of triangular partitioning supported in geometric partitioning mode, according to an embodiment of the present disclosure.
Figure 9:
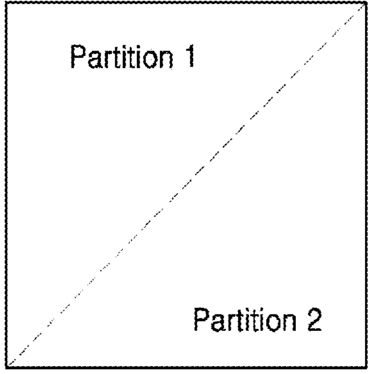

FIG. 9 is a diagram illustrating the types of triangular partitioning supported in geometric partitioning mode.

In the GPM, the inter predictor 124 performs inter predictions based on the triangular blocks resulting from partitioning the current block. GPM supports a total of 64 different types of triangular partitioning. FIG. 9 illustrate two of these triangular partitioning types. On the two triangular regions in each triangular partitioning type in GPM mode, the inter predictor 124 performs inter-prediction by using different motion information items (i.e., motion vectors).

Figure 10:
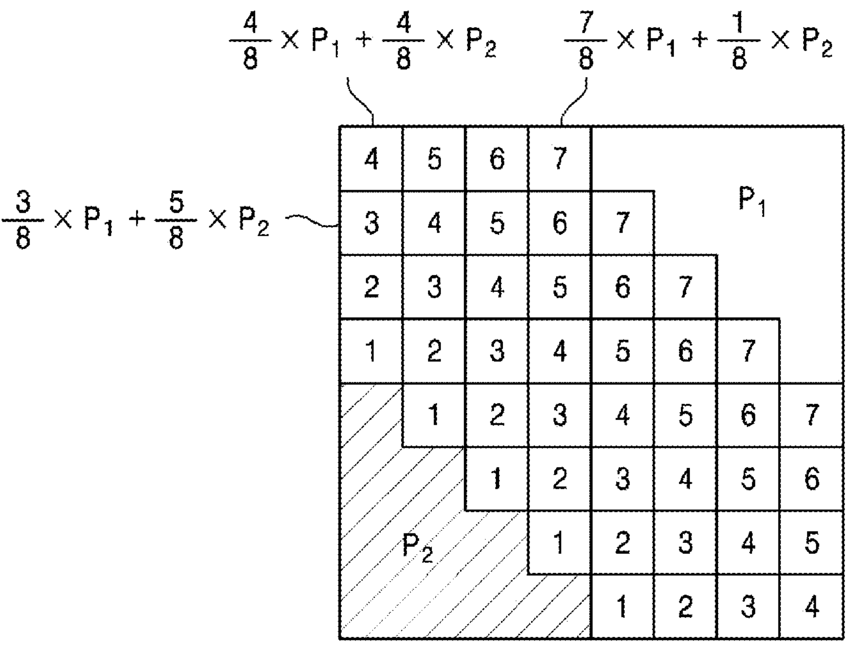
FIG. 10 is a diagram illustrating the weights utilized in geometric partitioning mode, according to an embodiment of the present disclosure.

The inter predictor 124 weight-sums the predicted signals of each partitioned region to generate final predicted signals to minimize discontinuities at the boundaries between the partitioned regions. The weights utilized to generate the final predicted signals may be illustrated as shown in FIG. 10. In the example of FIG. 10, P1 is the current block's predictor based on the motion information of the top-right triangular block, and P2 is the current block's predictor based on the motion information of the bottom-left triangular block.

Figure 11:
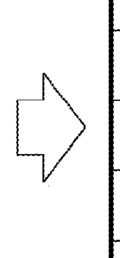
FIG. 11 is a diagram illustrating a geometric partitioning mode (GPM) candidate list, according to an embodiment of the present disclosure.

FIG. 11 is a diagram illustrating a GPM candidate list.

When the GPM mode candidate list is composed, the motion information of each partitioned region is derived from a regular merging candidate list, as illustrated in FIG. 11. If the index in the merging candidate list is even, the motion information in L0 (the first reference list) is selected, and if the index is odd, the motion information in L1 (the second reference list) is selected.

II-4. Template Matching

Figure 12:
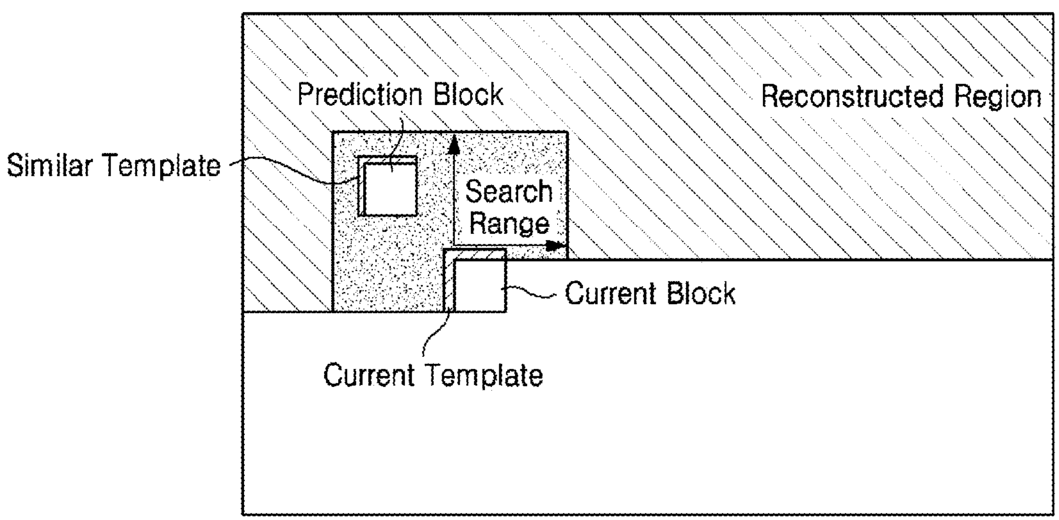
FIG. 12 is a diagram illustrating template matching in intra prediction, according to an embodiment of the present disclosure.

FIG. 12 is a diagram illustrating template matching in intra prediction, according to at least one embodiment of the present disclosure.

In template matching (TM) mode, the intra predictor 122 in the video encoding device searches for an optimal reference block by using a template in the reconstructed region of the current frame, and employs the optimal reference block just as the prediction block, as illustrated in FIG. 12. By calculating how closely the L-shaped template matches the current template, the intra predictor 122 may search for a similar template that is most similar to the current template, and use the block corresponding to the similar template as the prediction block. The search range of searching the template may be set in advance, and the prediction of the current block may be performed based on the preset search range.

On the other hand, the adaptive reordering of merge candidates with template matching (ARMC) technique adaptively reorders the merge candidates of the inter prediction based on the template matching described above. This scheme of reordering the merge candidates may be applied to regular merge mode, template matching (TM) merge mode, or affine merge mode (excluding SbTMVP candidates).

For example, in the template matching (TM) merge mode, the inter predictor 124 in the video encoding device may compose a merging candidate list, partition its merge candidates into subgroups of size 5, and for each subgroup, may reorder the merge candidates in ascending order, i.e., in order of increasing matching cost according to their template matching cost (hereinafter, TM cost). The TM cost may be defined as the sum of absolute differences (SAD) or the sum of squared differences (SSE) between the template samples in the current block and the corresponding reference samples.

Figure 13:
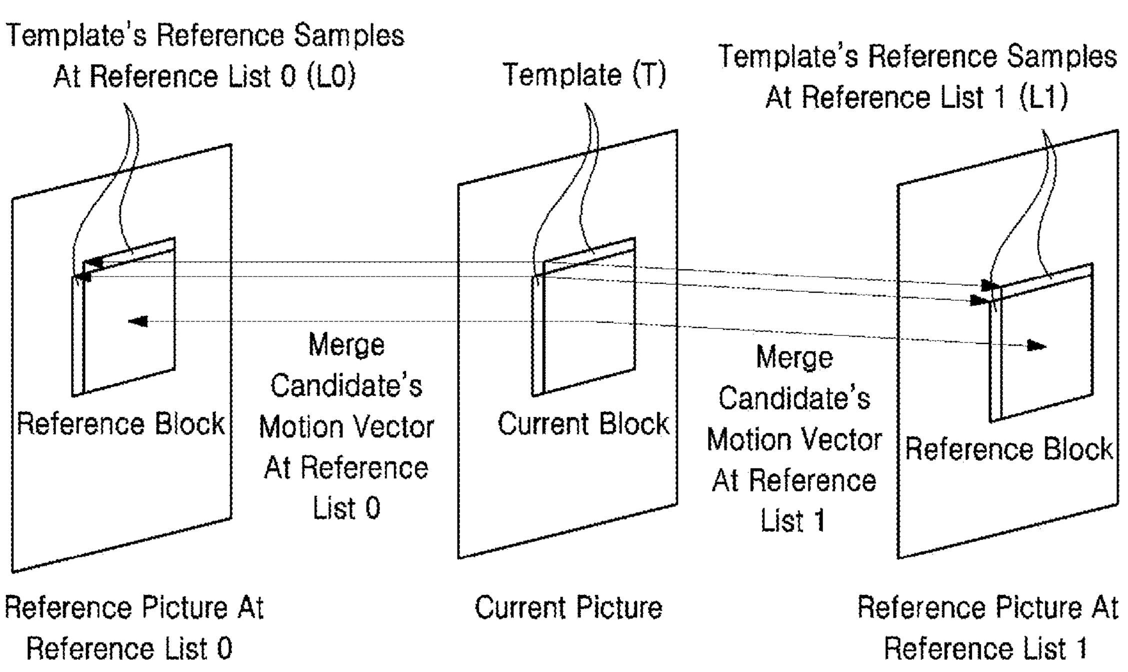
FIG. 13 is a diagram illustrating template matching in bi-directional prediction, according to an embodiment of the present disclosure.

If the merge candidate uses bi-directional prediction, the inter predictor 124 may derive reference samples of the merge candidate template based on the bi-directional prediction, as illustrated in FIG. 13.

II-5. DMVR and Multi-Path Decoder-Side Motion Vector Refinement

Decoder-side Motion Vector Refinement (DMVR) is a method of using a Bilateral Matching (BM) technique to refine the motion vectors at the decoder side by fine-tuning the motion vectors (MV0 and MV1) of the bi-directional prediction. Hereinafter, the motion vectors of the bi-directional prediction are used interchangeably with a motion vector pair.

The video encoding device, in the bi-directional prediction, searches for refined motion vectors around the initial motion vectors generated from the reference pictures in the reference lists L0 and L1. The initial motion vectors are the two motion vectors MV0 and MV1 of the bi-directional prediction. The BM technique calculates the BM cost which is the distortion between the two candidate blocks in the reference pictures in L0 and L1. As the BM cost, the SAD or SSE may be calculated between the two candidate blocks. The video encoding device generates as the refined motion vectors the motion vector candidates having the minimum BM cost, as shown in Equation 3.

$$MVo' = MVo + MVoffset$$

$$MV1' = MV1 - MVoffset$$

[Equation 3]

Here, MVoffset is an offset applied to the initial motion vectors as the motion vector refinement progresses, which is the difference between the candidate motion vectors and the initial motion vectors. This offset may be formed as a sum of an integer offset in integer sample units, and a sub-pixel offset in sub-pixel or sub-pel sample units. As shown in Equation 3, a mirroring rule is followed for the offsets of the candidates of the two motion vectors.

The multi-pass decoder-side motion vector refinement is a method of refining motion vectors in multiple passes at the decoder side by using the BM technique. Hereinafter, the multi-pass decoder-side motion vector refinement using the BM technique is referred to as Multi-pass Bilateral Matching (MBM).

The video encoding device searches for motion vectors on a CU-by-CU basis in the first pass of multiple passes of MBM, and in the second pass, searches for motion vectors for each 16×16 subblock within the CU. In the third pass, the video encoding device applies Bi-directional Optical Flow (BDOF) to search for motion vectors for each 8×8 subblock. The refined motion vectors by these searches are stored for the prediction of spatial and temporal motion vectors. BDOF is a technique that further compensates for the motion of the predicted samples by using bi-directional motion prediction, based on the assumption that the constituent samples or objects of the image move at a constant speed and the assumption that there is little change in the sample values.

The multi-pass decoder-side motion vector refinement specifically performs the following process.

In the first pass, the video encoding device generates refined motion vectors (MV0_pass1 and MV1_pass1) around motion vectors (MV0 and MV1) by using as initial motion vectors the motion vectors (MV0 and MV1) of the bi-directional prediction, which are generated from the reference pictures in the reference lists L0 and L1. At this time, the refined motion vectors may be generated based on the minimum BM cost for the two reference blocks in L0 and L1, as shown in Equation 4.

$$\mathrm{MVo\_pass1} = MVo + deltaMV \qquad \text{[Equation 4]}$$

$$MV1\_\mathrm{pass1} = MV1 - deltaMV$$

Here, deltaMV may be searched according to a 3×3 square search pattern around the initial MV with a precision of integer samples around the initial value.

In the second pass, the video encoding device applies the BM (bilateral matching) to the 16×16 subblocks. For each subblock, the video encoding device refines the motion vectors around MV0_pass1 and MV1_pass1 obtained in the first pass from the reference lists L0 and L1 to generate MV0_pass2 and MV1_pass2. At this time, the motion vectors are searched at an integer sample precision. Then, the video encoding device generates deltaMV (sbIdx2) as shown in Equation 5 by using a subsample-wise refining process according to DMVR technology.

$$\mathrm{MVo\_pass2}(sbIdx2) = \mathrm{MVo\_pass1} + deltaMV(sbIdx2) \qquad \text{[Equation 5]}$$

$$MV1\_\mathrm{pass2}(sbIdx2) = MV1\_\mathrm{pass1} - deltaMV(sbIdx2)$$

Here, sbIdx2 represents the index of a 16×16 subblock.

In the third pass, the video encoding device applies the BDOF to the 8×8 subblocks to derive the final motion vectors. For each 8×8 subblock, the video encoding device applies the BDOF to the motion vectors obtained in the second pass. The final motion vectors generated in the third pass, MV0_pass3, and MV1_pass3, are represented as shown in Equation 6.

$$\mathrm{MVo\_pass3}(sbIdx3) = \mathrm{MVo\_pass2}(sbIdx2) + bioMv \qquad \text{[Equation 6]}$$

$$\mathrm{MV1\_pass3}(sbIdx3) = \mathrm{MVo\_pass2}(sbIdx2) - bioMv$$

Here, sbIdx3 represents the index of an 8×8 subblock, and bioMV represents the correction value due to the application of BDOF.

Hereinafter, for each pass, MBM cost represents the block matching cost between two blocks indicated by the searched motion vectors. Additionally, deltaMV, deltaMV (sbIdx2), and bioMV are collectively referred to as the refined values or 'refinement values' of the refined motion vectors. Further, for the initial motion vectors of the first pass, the refinement value may represent the sum of all or some of deltaMV, deltaMV (sbIdx2), and bioMV.

II-6. Bi-Directional Matching AMVP-MERGE Mode

Figure 14:
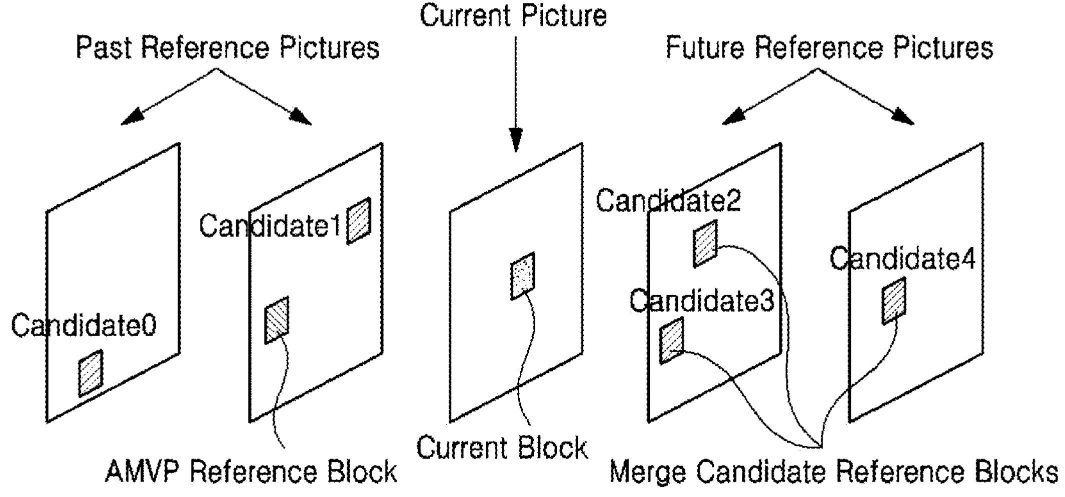
FIG. 14 is a diagram illustrating a bi-directional matching AMVP-MERGE mode, according to an embodiment of the present disclosure.

FIG. 14 is a diagram illustrating a bi-directional matching AMVP-MERGE mode, according to at least one embodiment of the present disclosure.

In the bi-directional matching AMVP-MERGE mode (BM AMVP-MERGE mode), the video encoding device is responsive to when the uni-directional AMVP mode is selected for the reference picture in the LX direction (X=0 or 1), for refining the motion vector of a merge candidate with respect to a reference picture in the opposite direction that is temporally equidistant. For the refinement, a bi-directional matching technique is utilized.

For bi-directional matching-based motion vector refinement, the video encoding device generates refined motion vectors by applying the multi-pass decoder-side motion vector refinement by using as initial motion vectors the AMVP vector in the LX direction and the merge candidate motion vector in the L1-X direction. At this time, the AMVP motion vector may be changed as much as the merge candidate motion vector is refined. For example, if the AMVP motion vector's refinement value is MVD0, the refinement value MVD1 of the merge candidate motion vector may be −MVD0.

II-7. Reference to Out of Boundary Region of Reference Frame

Figure 15:
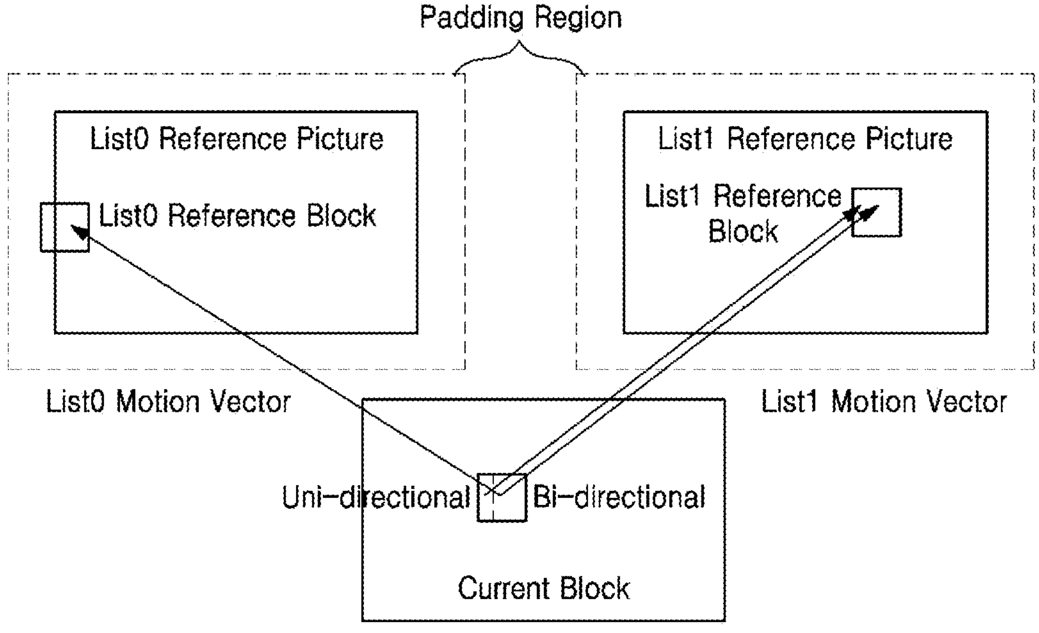
FIG. 15 is a diagram illustrating a reference of an outer region of a reference frame, according to at least one embodiment of the present disclosure.

FIG. 15 is a diagram illustrating a reference of an outer region of a reference frame.

As shown in the example of FIG. 15, the video encoding device may reference an out-of-boundary region or outer region of a reference frame (i.e., a 'reference picture') when the current block is inter-predicted. By padding reference samples around the reference frame boundary, a reference block may be generated by referencing with a motion vector the outside region external to the frame boundary. As shown in the example of FIG. 15, the video encoding device generates an inter-prediction block of the current block for bi-directional motion compensation. A portion of the L0 reference block can be located in the outer region of the reference picture, and the L1 reference block can be located in the inner region of the reference picture. L0 denotes reference picture list 0, and L1 denotes reference picture list 1. The reference block portion located in the outer region of the frame is generally mere repetitive samples derived from boundary samples within the reference picture, possibly resulting in very low prediction efficiency. In this case, the video encoding device may use the reference block as it is with its portion left in the outer region.

Alternatively, when the video encoding device combines two or more prediction blocks in the motion compensation process, the video encoding device may dispense with the motion vectors that reference the outer region and may use only the motion vectors that do not, for generating the final prediction block.

For specific explanation, the position of the current block is defined as Pos_x, Pos_y, and the position of each accompanying pixel in the current block is represented by $Pos\_x_{ij}$, $Pos\_y_{ij}$. Additionally, the motion vector of the current block is represented by $Mv\_x^{LX}$, $Mv\_y^{LX}$. Here, LX=L0 or L1. Additionally, $Pos_{leftbdry}$, $Pos_{rightbdry}$, $Pos_{topbdry}$, and $Pos_{bottombdry}$ are the frame boundaries that delimit the area of the frame, representing the left, right, top, and bottom boundaries. At this time, when the conditions of Equation 7 are satisfied, the video encoding device may determine that the pixels $P_{i,j}^{LX}$ in the prediction block are located in the Out of Boundary (OOB) region of the frame.

$$(\mathrm{Pos\_x}_{i,j} + \mathrm{Mv\_x}^{LX}) > (Pos_{rightbdry} + \mathrm{half\_pixel}),$$
$$(\mathrm{Pos\_x}_{i,j} + \mathrm{Mv\_x}^{LX}) < (Pos_{leftbdry} - \mathrm{half\_pixel}),$$
$$(\mathrm{Pos\_y}_{i,j} + \mathrm{Mv\_y}^{LX}) > (Pos_{bottombdry} + \mathrm{half\_pixel}), \text{ or}$$
$$(\mathrm{Pos\_y}_{i,j} + \mathrm{Mv\_y}^{LX}) < (Pos_{topbdry} - \mathrm{half\_pixel}) \quad \text{[Equation 7]}$$

In VVC (Versatile Video Coding) technology, motion vectors are used in 1/16 pixel units. Therefore, in Equation 7, if the motion vector is calculated in 1/16 pixel units, half_pixel may be set to 8.

If one of the prediction blocks ($P_{i,j}^{L0}$, $P_{i,j}^{L1}$) in the L0 and L1 directions is or is not located in the outer region according to the condition of Equation 7, the video encoding device may calculate the final prediction block ($P_{i,j}^{final}$) as shown in Equation 8.

[Equation 8]

If $P_{i,j}^{L0}$ is OOB and $P_{i,j}^{L1}$ is non-OOB
  $P_{i,j}^{final} = P_{i,j}^{L1}$
else if $P_{i,j}^{L0}$ is non-OOB and $P_{i,j}^{L1}$ is OOB
  $P_{i,j}^{final} = P_{i,j}^{L0}$
else
  $P_{i,j}^{final} = (P_{i,j}^{L0} + P_{i,j}^{L1} + 1) >> 1$ The following describes methods of adaptively generating prediction blocks rather than refraining from using motion vectors referencing outer regions. The following embodiments are performed in the video decoding device by the inter predictor 544, but may also be performed in the video encoding device by the inter predictor 124 as described above.

III. Adaptive Generation of Prediction Block According to Embodiments

First, described is a method of using a prediction block located in an outer region.

In a bi-directional prediction process, when there are a prediction block $P_{i,j}^{LX}$ located in the outer region and a prediction block $P_{i,j}^{L1-X}$ located in the inner region, the video decoding device may generate a final prediction block by using weights as shown in Equation 9.

$$P_{i,j}^{final} = w_1 \cdot P_{i,j}^{LX} + w_2 \cdot P_{i,j}^{L1-X} \quad \text{[Equation 9]}$$

Here, LX=L0 in $P_{i,j}^{LX}$ represents the prediction block in the L0 direction and LX=L1 in $P_{i,j}^{LX}$ represents the prediction block in the L1 direction. The weights $w_1$ and $w_2$ are values from 0 to 1, satisfying that $w_1+w_2=1$. The weights may be preset according to an agreement between the video encoding device and the video decoding device. Alternatively, after the weights are determined in terms of optimizing the coding efficiency, the video encoding device may signal the weights to the video decoding device.

In Equation 9, all pixels included in the two prediction blocks are assigned weights, but the video decoding device may assign the weights in a region-adapted manner. For example, where a prediction block $P_{i,j}^{LX}$ that is partially located in the outer region is composed of an outer region $P_{i,j}^{LX}$ (A) and an inner region $P_{i,j}^{LX}$ (A'), the video decoding device may weight the samples located in region A' the same as the samples in prediction block $P_{i,j}^{L1-X}$. On the other hand, for samples located in region A, the video decoding device may assign a weight less than the prediction block $P_{i,j}^{L1-X}$ or assign a weight of zero. In this case, $w_1+w_2=1$.

Figure 16:
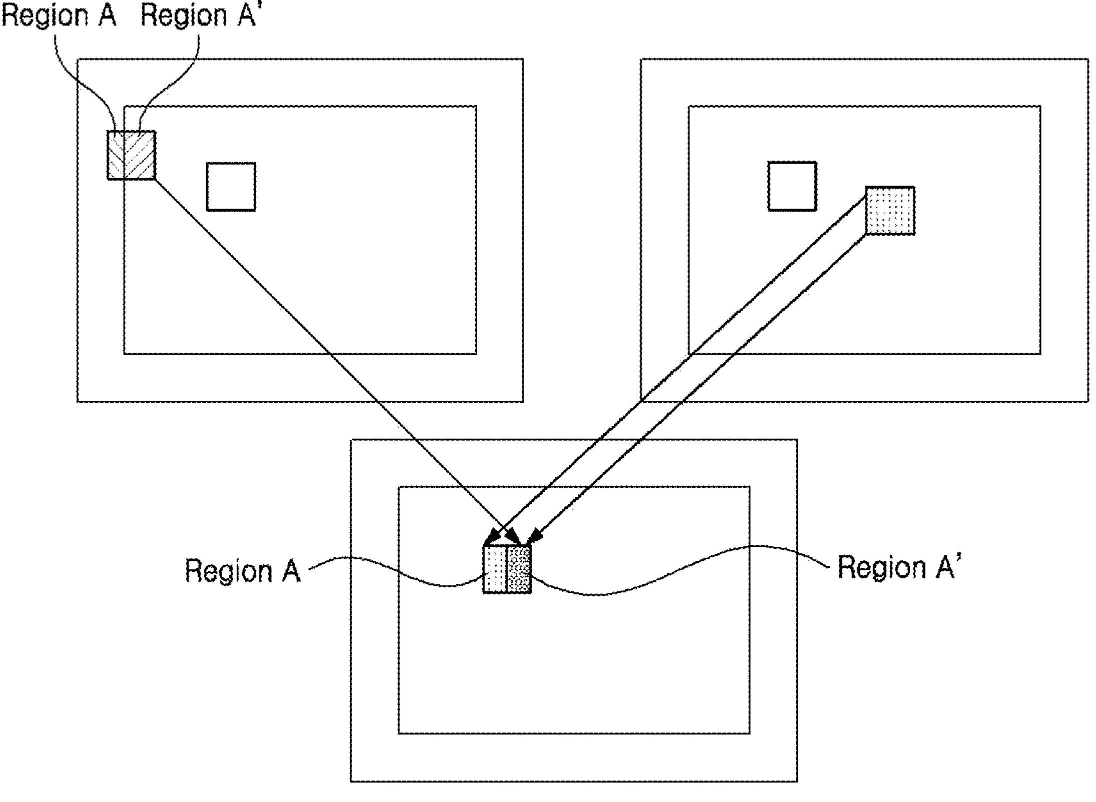
FIG. 16 is a diagram illustrating region-adaptive weighting, according to at least one embodiment of the present disclosure.

FIG. 16 illustrates the process described above. In the generation of the final prediction block, the weight of region A is set to zero, reflecting only pixels of $P_{i,j}^{L1-X}$ in that region. On the other hand, for region A', the video decoding device may give equal weight (e.g., 0.5) to the prediction blocks $P_{i,j}^{LX}$ and $P_{i,j}^{L1-X}$ during the generation of the final prediction block.

While the examples of Equation 9 and FIG. 16 relate to a final prediction block generated during a bi-directional prediction process, the prediction block may be located in an out-of-boundary region during an intermediate process of motion prediction that is not necessarily bi-directional. For example, when refining the motion vector at the decoder side, all or part of the prediction block may be located in the outer region. Examples of such include multi-path decoder-side motion vector refinement, template matching, and AMVP-MERGE mode-based motion vector prediction. When the motion vector is refined at the decoder side, if all or part of the prediction block is located in the outer region, the video decoding device may generate weights as follows, and may generate the final prediction block according to the generated weights.

In one example, the video decoding device may use weights according to Equation 9.

As another example, the video decoding device may not utilize blocks or subblocks that are located in an out-of-boundary region. In other words, during motion vector refining, the video decoding device may exclude those motion vectors from the refined candidates.

As yet another example, the video decoding device may regionally adaptively generate weights, as shown in the example of FIG. 16.

Figure 17:
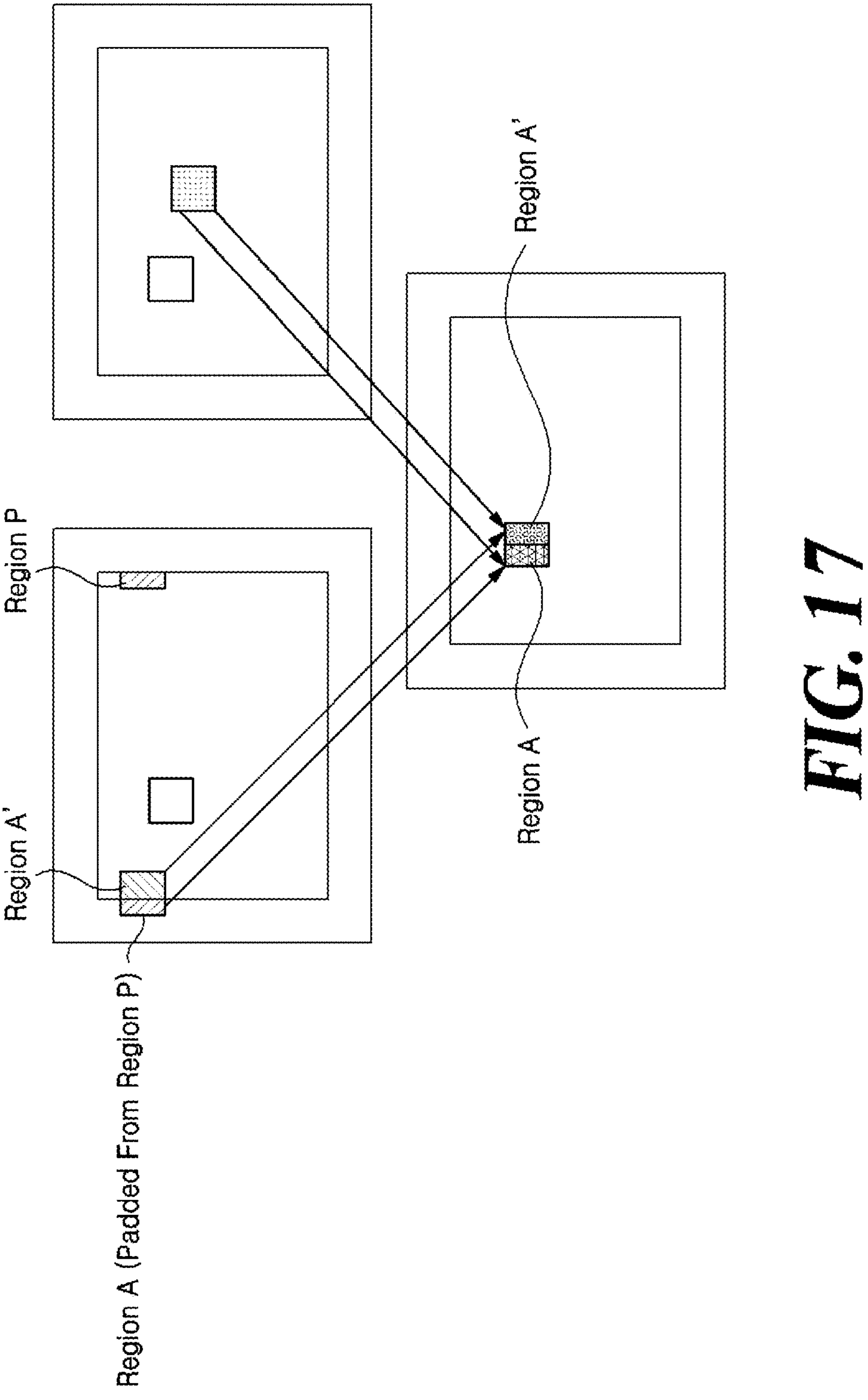
FIG. 17 is a diagram illustrating equal weighting, according to at least one embodiment of the present disclosure.

Typically, regions outside the reference frame are padded by copying pixels from regionally contiguous boundaries. However, pixels may be copied from regions other than regionally contiguous boundaries, and the copied pixels may be used for padding. For example, this is used to compress 360-degree video. In such a case, even though the prediction blocks exist in an outer region, the video decoding device may use the same weights to generate the final prediction block. The example in FIG. 17 illustrates this process. Pixel values from the right boundary are used to pad the outer region of the left boundary. Copying pixels from areas other than regionally contiguous boundaries includes copying pixels inter-screen in addition to intra-screen.

During the intermediate process of motion prediction, the prediction block may be located in the outer region. For example, when the motion vector is refined at the decoder side, all or part of the prediction block may be located in the outer region. Examples of such include multi-path decoder-side motion vector refinement, template matching, and AMVP-MERGE mode-based motion vector prediction. When the motion vector is refined at the decoder side, if the prediction block is located in the outer region, the video decoding device may generate the final prediction block as follows. For example, it is assumed that some or all of the prediction blocks located in the L1 direction are located in the outer region.

In one example, the video decoding device may utilize only the prediction blocks in the L0 direction located in the inner region to generate the final prediction block. In other words, the weight of the prediction blocks in the L1 direction may be set to zero.

As another example, the video decoding device may utilize the inner region excluding the outer region of the prediction blocks in the L1 direction to generate the final prediction block. For example, the final prediction block may be generated by using the example of Equation 9 and FIG. 16.

As yet another example, the video decoding device may detect that the prediction blocks in the L0 or L1 direction are located in the outer region and may dispense with the two prediction blocks in generating the final prediction block. Namely, the motion vectors corresponding to the prediction blocks in the L0 and L1 directions may be excluded from the refined candidates.

Described next is a method of constraining motion vectors for prediction blocks located in the outer region.

As described above, a prediction block may be located in the outer region during the intermediate process of motion prediction. For example, when the motion vector is refined at the decoder side, the prediction block may be located in the outer region. Examples of such include multi-path decoder-side motion vector refinement, template matching, and AMVP-MERGE mode-based motion vector prediction.

Figure 18:
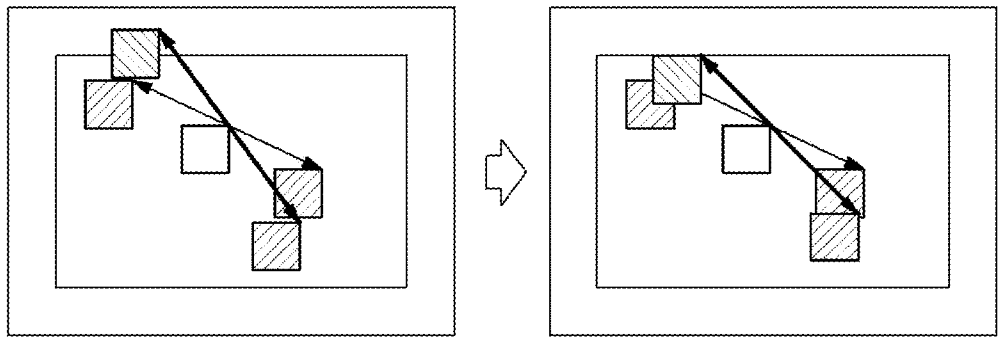
FIG. 18 is a diagram illustrating limiting the range of motion vector refinement, according to at least one embodiment of the present disclosure.

In addition to bi-directional prediction, encompassing the decoder-side motion vector refinement described above, the video decoding device may limit the scope of motion vector refinement such that the prediction block is not located in the outer region. As shown in the example of FIG. 18, in the process of refining the motion vector on the decoder side, if a block falls out in the outer region after refining, the video decoding device may confine the motion vector to the inner region.

When the motion vector is refined at the decoder side, if the prediction block in the L0 or L1 direction is located in an outer region, the video decoding device may exclude the motion vector from the refined candidates for generating the final prediction block. Alternatively, the video decoding device may omit generating that motion vector.

Hereinafter, using the examples of FIGS. 19 and 20, methods of inter-predicting a current block according to some embodiments of the present disclosure are described.

Figure 19:
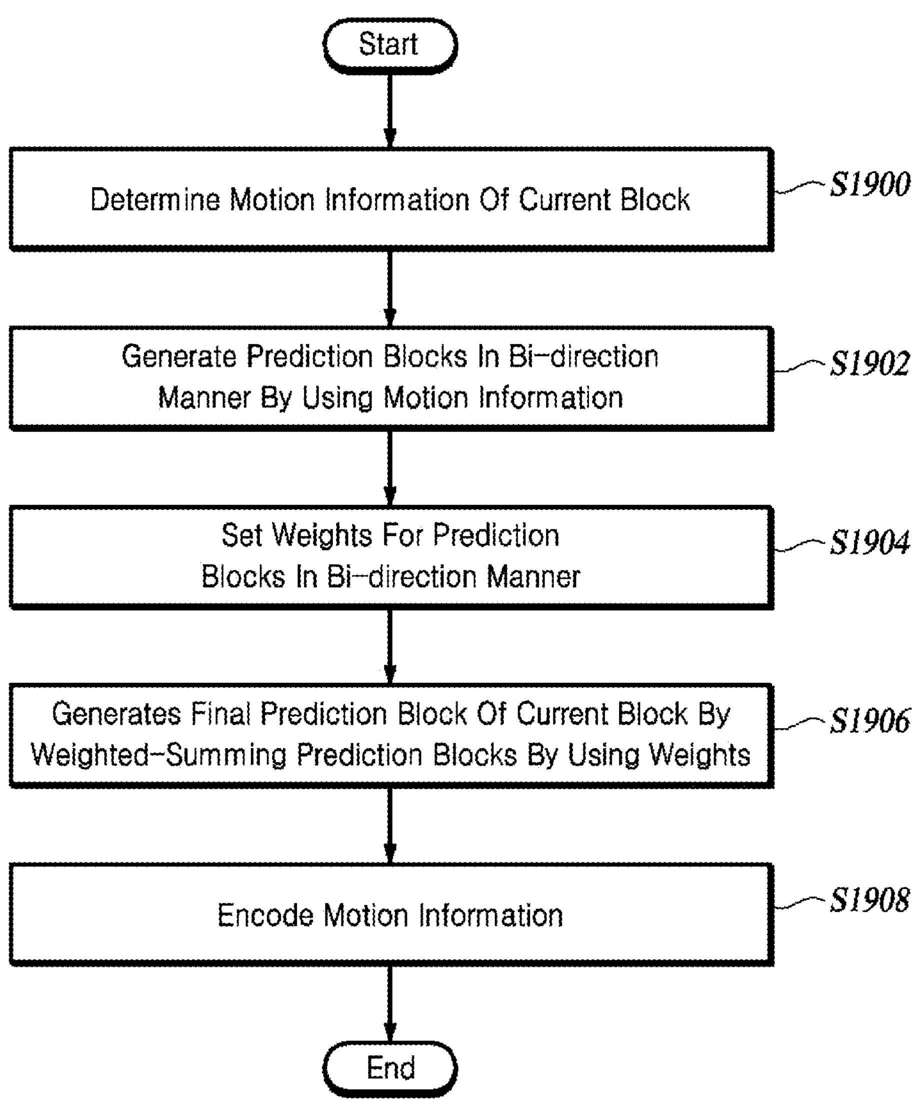
FIG. 19 is a flowchart of a method performed by a video encoding device for inter-predicting the current block, according to at least one embodiment of the present disclosure.

FIG. 19 is a flowchart of a method performed by the video encoding device for inter-predicting the current block, according to at least one embodiment of the present disclosure.

The video encoding device determines the motion information of the current block (S1900). The motion information can include reference pictures in two directions, and motion vectors in two directions. The two directions include the L0 direction and the L1 direction.

The video encoding device generates prediction blocks in both directions by using the motion information (S1902). The prediction blocks include a first prediction block located inside the corresponding first reference picture and a second prediction block that includes both an inner region located inside the corresponding second reference picture and an outer region located outside the corresponding second reference picture. The first prediction block may be a prediction block in the L0 or L1 direction.

The video encoding device sets weights for the prediction blocks in both directions (S1904).

The video encoding device weight-sums the prediction blocks by using the weights to generate a final prediction block of the current block (S1906).

The video encoding device encodes the motion information (S1908).

Figure 20:
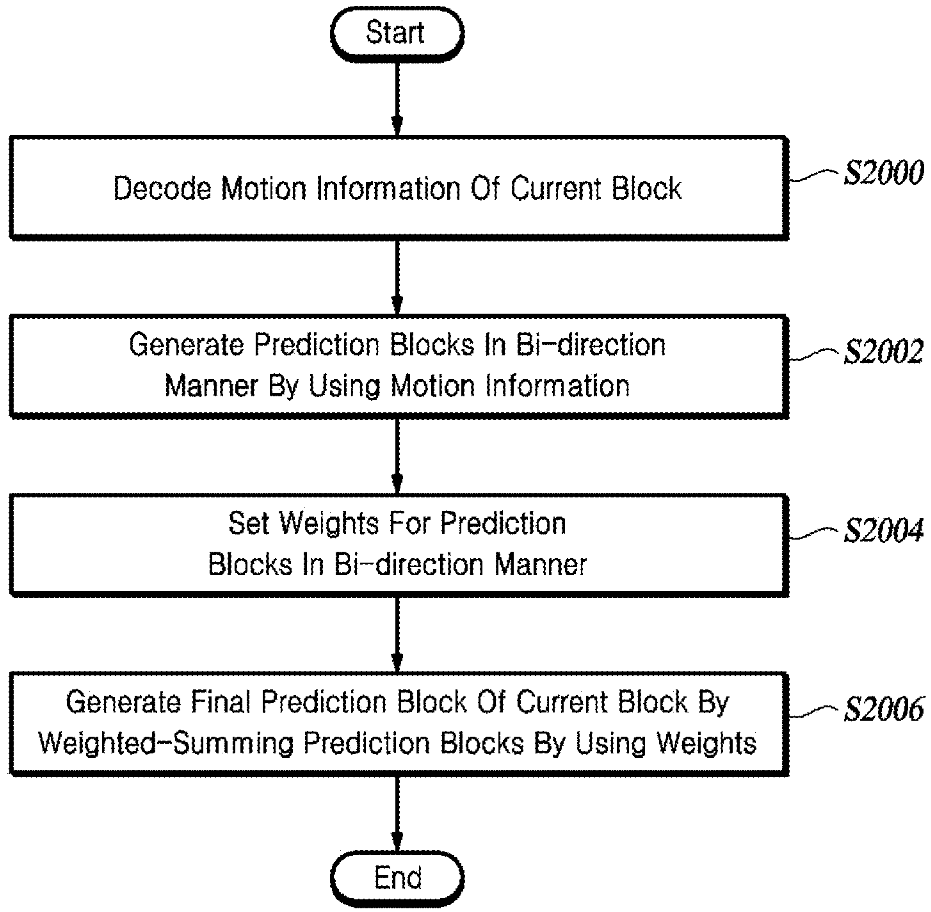
FIG. 20 is a flowchart of a method performed by a video decoding device for inter-predicting the current block, according to at least one embodiment of the present disclosure.

FIG. 20 is a flowchart of a method performed by the video decoding device for inter-predicting the current block, according to at least one embodiment of the present disclosure.

The video decoding device decodes motion information of the current block (S2000). The motion information can include reference pictures in both directions and motion vectors in both directions. The two directions include the L0 direction and the L1 direction.

The video decoding device generates prediction blocks in both directions by using the motion information (S2002). The first prediction block of the prediction blocks can be located inside a corresponding first reference picture, and the remaining second prediction block includes both an inner region located inside the corresponding second reference picture and an outer region located outside the corresponding second reference picture. The first prediction block may be a prediction block in the L0 or L1 direction.

The video decoding device sets weights for the prediction blocks in both directions (S2004).

The video decoding device weight-sums the prediction blocks by using the weights to generate a final prediction block of the current block (S2006).

Hereinafter, using the examples of FIGS. 21 and 22, methods are described for inter-predicting the current block after the motion vectors is refined at the decoder side.

Figure 21:
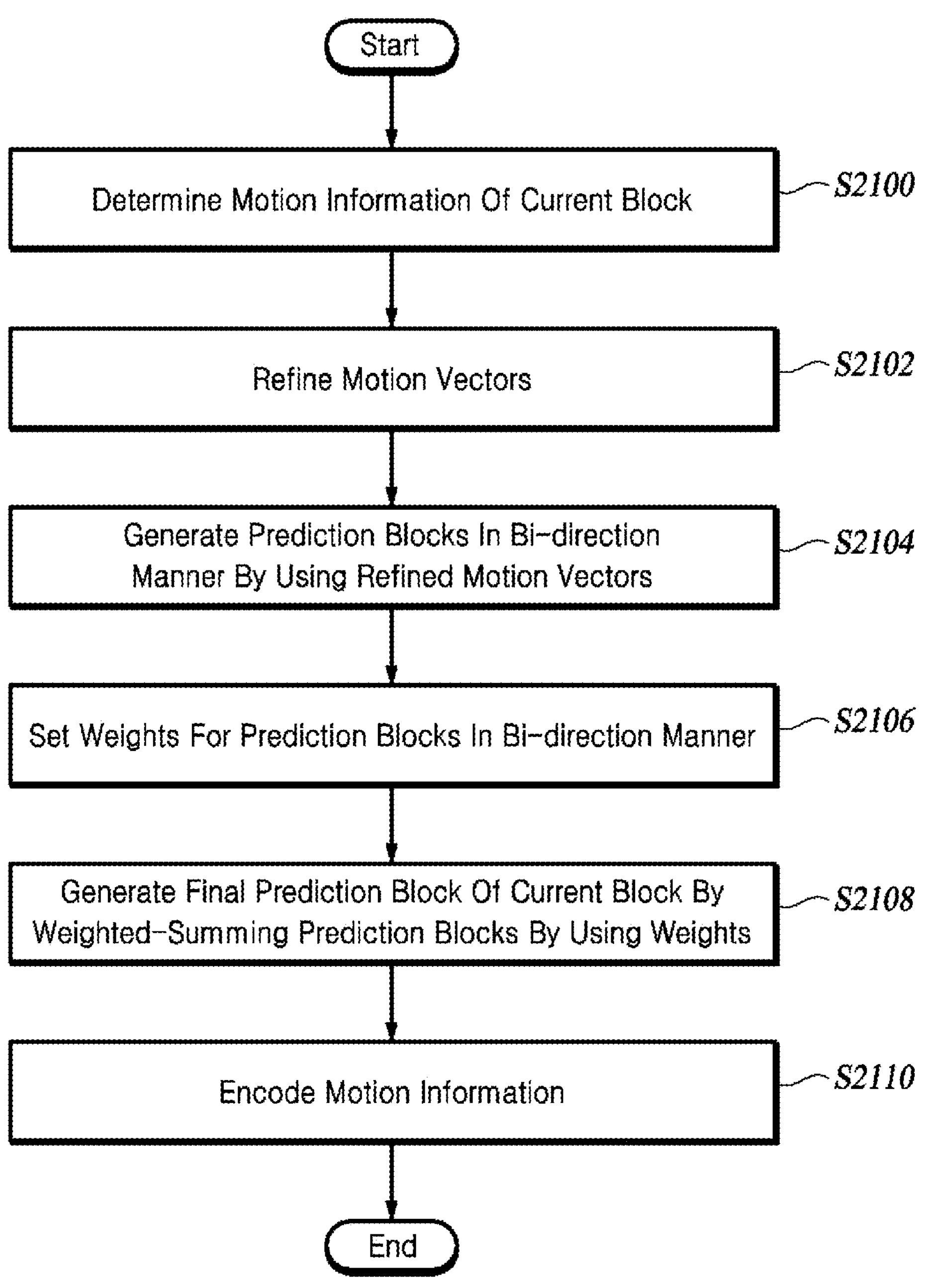
FIG. 21 is a flowchart of a method performed by the video encoding device for inter-predicting the current block, according to an embodiment of the present disclosure.

FIG. 21 is a flowchart of a method performed by the video encoding device for inter-predicting the current block, according to another embodiment of the present disclosure.

The video encoding device determines the motion information of the current block (S2100). The motion information can include reference pictures in two directions, and motion vectors in two directions. The two directions include an L0 direction and an L1 direction.

The video encoding device refines motion vectors at the decoder side (S2102). Examples of refining the motion vectors include multi-path decoder-side motion vector refinement, template matching, AMVP-MERGE mode-based motion vector prediction, and the like.

The video encoding device uses the refined motion vectors to generate prediction blocks in both directions (S2104). The first prediction block of the prediction blocks can be located inside the corresponding first reference picture, and the remaining second prediction block includes both an inner region located inside the corresponding second reference picture and an outer region located outside the corresponding second reference picture. The first prediction block may be a prediction block in the L0 or L1 direction.

The video encoding device sets weights for the prediction blocks in both directions (S2106).

The video encoding device weight-sums the prediction blocks by using the weights to generate a final prediction block of the current block (S2108).

The video encoding device encodes the motion information (S2110).

Figure 22:
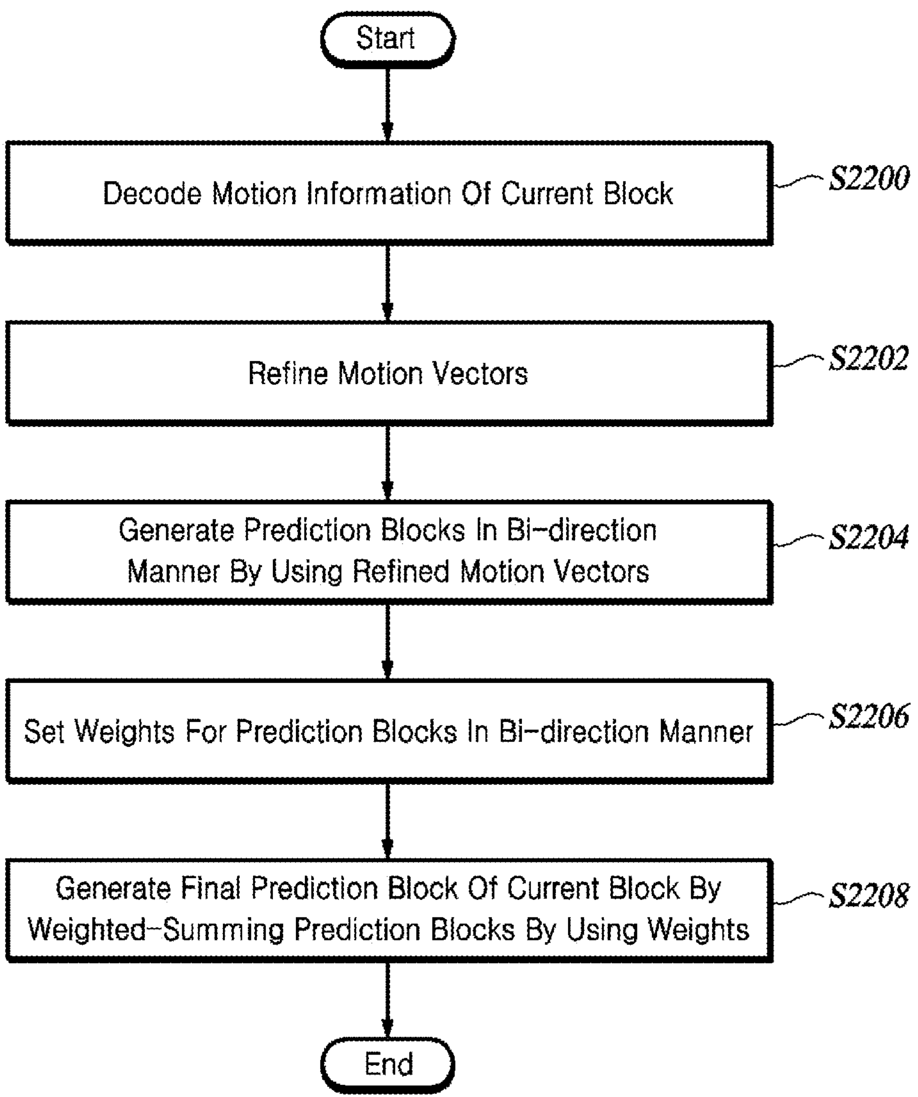
FIG. 22 is a flowchart of a method performed by the video decoding device for inter-predicting the current block, according to an embodiment of the present disclosure.

FIG. 22 is a flowchart of a method performed by the video decoding device for inter-predicting the current block, according to another embodiment of the present disclosure.

The video decoding device decodes motion information of the current block (S2200). The motion information can include reference pictures in two directions, and motion vectors in two directions. The two directions include an L0 direction and an L1 direction.

The video decoding device refines motion vectors at the decoder side (S2202). Examples of refining the motion vectors include multi-path decoder-side motion vector refinement, template matching, AMVP-MERGE mode-based motion vector prediction, etc.

The video decoding device generates prediction blocks in both directions by using the motion information (S2204). The first prediction block of the prediction blocks can be located inside the corresponding first reference picture, and the remaining second prediction block includes both an inner region located inside the corresponding second reference picture and an outer region located outside the corresponding second reference picture. The first prediction block may be a prediction block in the L0 or L1 direction.

The video decoding device sets weights for the prediction blocks in both directions (S2206).

The video decoding device weight-sums the prediction blocks by using the weights to generate a final prediction block of the current block (S2208).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not necessarily limited to the illustrated chronological sequences.

It can be understood that the above description presents illustrative example embodiments that may be implemented in various other manners. The functions described in some embodiments may be realized by hardware, software, firmware, and/or their combination. It can also be understood that the functional components described in the present disclosure can be labeled by " . . . unit" to strongly emphasize the possibility of their independent realization.

Various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although example embodiments of the present disclosure have been described for illustrative purposes, those having ordinary skill in the art to which this disclosure pertains can appreciate that various modifications, additions, and substitutions can be possible, without departing from the idea and scopes of the present disclosure. Therefore, example embodiments of the present disclosure have been described for the sake of brevity and clarity. The scopes of technical ideas of the example embodiments of the present disclosure are not necessarily limited by the illustrations. Accordingly, those having ordinary skill in the art to which the present disclosure pertains can understand that the scopes of the present disclosure are not necessarily limited by the above explicitly described embodiments but by the claims and equivalents thereof.

What is claimed is:

1. A method of video decoding, the method comprising:

decoding motion information of a current block from a bitstream, the motion information including reference pictures that are in a bi-direction manner, and the motion information also including motion vectors that are in the bi-direction manner;

generating prediction blocks that are in the bi-direction manner by using the motion information, wherein the prediction blocks include a first prediction block corresponding to a first reference picture, wherein the prediction blocks include a second prediction block that is a remnant of the first prediction block, wherein the second prediction block includes an inner region located inside a second reference picture that is relevant, and wherein the second prediction block includes an outer region located outside the second reference picture;

setting weights for the prediction blocks that are in the bi-direction manner, wherein setting the weights comprises, in response to the outer region of the second prediction block being padded with pixels present in a region other than a boundary that is regionally contiguous with the second reference picture, setting, for samples in the outer region, weights that are common to the first prediction block; and generating a final prediction block of the current block by weighted-summing the prediction blocks by using the weights.

2. The method of claim 1, wherein each of the weights has a value that ranges from 0 to 1, and a sum of the weights is equal to 1.

3. The method of claim 1, wherein setting the weights comprises setting, for samples in the inner region of the second prediction block, weights that are common to the first prediction block.

4. The method of claim 1, wherein setting the weights comprises setting, for samples in the outer region of the second prediction block, weights smaller than weights for the first prediction block or setting the weights to zero for the samples in the outer region of the second prediction block.

5. The method of claim 1, further comprising:

refining the motion vectors; and generating the prediction blocks that are in the bi-direction manner by using the refined motion vectors.

6. The method of claim 5, wherein refining the motion vectors comprises excluding the motion vectors corresponding to the second prediction block from candidate motion vectors for refining.

7. The method of claim 5, wherein refining the motion vectors comprises excluding the motion vectors corresponding to both the first prediction block and the second prediction block from candidate motion vectors for refining.

8. The method of claim 5, wherein refining the motion vectors comprises constraining the motion vector corresponding to the second prediction block to be located in the inner region of the second reference picture.

9. The method of claim 5, wherein setting the weights comprises setting, for samples in the outer region of the second prediction block, second weights smaller than first weights for the first prediction block or setting the second weights to zero for the samples in the outer region of the second prediction block.

10. The method of claim 5, wherein setting the weights comprises setting a second weight of the second prediction block to zero.

11. A method of video encoding for inter-predicting a current block, the method comprising:

determining motion information of the current block, the motion information including reference pictures that are in a bi-direction manner, and the motion information also including motion vectors that are in the bi-direction manner;

generating prediction blocks that are in the bi-direction manner by using the motion information, wherein the prediction blocks include a first prediction block corresponding to a first reference picture, wherein the prediction blocks include a second prediction block that is a remnant of the first prediction block, wherein the second prediction block includes an inner region located inside a second reference picture that is relevant, and wherein the second prediction block includes an outer region located outside the second reference picture;

setting weights for the prediction blocks that are in the bi-direction manner, wherein setting the weights comprises, in response to the outer region of the second prediction block being padded with pixels present in a region other than a boundary that is regionally contiguous with the second reference picture, setting, for samples in the outer region, weights that are common to the first prediction block; and generating a final prediction block of the current block by weighted-summing the prediction blocks by using the weights.

12. The method of claim 11, further comprising encoding the motion information.

13. The method of claim 11, further comprising:

refining the motion vectors; and generating the prediction blocks that are in the bi-direction manner by using the refined motion vectors.

14. A method for providing video data to a video decoding device, the method comprising:

encoding the video data into a bitstream; and transmitting the bitstream to the video decoding device;

wherein encoding the video data comprises:

determining motion information of a current block, the motion information including reference pictures that are in a bi-direction manner, and the motion information also including motion vectors that are in the bi-direction manner;

generating prediction blocks that are in the bi-direction manner by using the motion information, wherein the prediction blocks include a first prediction block corresponding to a first reference picture, wherein the prediction blocks include a second prediction block that is a remnant of the first prediction block, wherein the second prediction block includes an inner region located inside a second reference picture that is relevant, and wherein the second prediction block includes an outer region located outside the second reference picture;

setting weights for the prediction blocks that are in the bi-direction manner, wherein setting the weights comprises, in response to the outer region of the second prediction block being padded with pixels present in a region other than a boundary that is regionally contiguous with the second reference picture, setting, for samples in the outer region, weights that are common to the first prediction block; and generating a final prediction block of the current block by weighted-summing the prediction blocks by using the weights.

15. The method of claim 14, wherein encoding the video data further comprises encoding the motion information.

16. The method of claim 14, wherein encoding the video data further comprises:

refining the motion vectors; and generating the prediction blocks that are in the bi-direction manner by using the refined motion vectors.

17. The method of claim 16, wherein refining the motion vectors comprises excluding the motion vectors corresponding to the second prediction block from candidate motion vectors for refining.

18. The method of claim 16, wherein refining the motion vectors comprises excluding the motion vectors corresponding to both the first prediction block and the second prediction block from candidate motion vectors for refining.

19. The method of claim 16, wherein refining the motion vectors comprises constraining the motion vector corresponding to the second prediction block to be located in the inner region of the second reference picture.

* * * * *